United States Patent
Ophardt et al.

(10) Patent No.: US 10,178,928 B2
(45) Date of Patent: Jan. 15, 2019

(54) INTERACTIVE DISPLAY DEVICE

(71) Applicant: OP-Hygiene IP GmbH, Niederbipp (CH)

(72) Inventors: Heiner Ophardt, Arisdorf (CH); David Duncan, St. Catharines (CA); Hendrik Ophardt, Vineland (CA)

(73) Assignee: OP-Hygiene IP GmbH, Niederbipp (CH)

( * ) Notice: Subject to any disclaimer, the term of this patent is extended or adjusted under 35 U.S.C. 154(b) by 26 days.

(21) Appl. No.: 15/423,996

(22) Filed: Feb. 3, 2017

(65) Prior Publication Data

US 2017/0215655 A1 Aug. 3, 2017

Related U.S. Application Data

(60) Provisional application No. 62/290,606, filed on Feb. 3, 2016, provisional application No. 62/358,508, filed on Jul. 5, 2016.

(51) Int. Cl.
| | |
|---|---|
| A47K 5/00 | (2006.01) |
| A47K 5/12 | (2006.01) |
| E03C 1/04 | (2006.01) |
| E03C 1/05 | (2006.01) |
| E03C 1/14 | (2006.01) |
| F21V 8/00 | (2006.01) |
| G06F 3/01 | (2006.01) |
| G06F 3/0482 | (2013.01) |
| B67D 1/00 | (2006.01) |
| B67D 1/08 | (2006.01) |
| G06F 3/16 | (2006.01) |
| G06F 3/03 | (2006.01) |
| G06F 3/048 | (2013.01) |

(Continued)

(52) U.S. Cl.
CPC ............ *A47K 5/1217* (2013.01); *A47K 3/281* (2013.01); *A47K 5/1202* (2013.01); *A47K 5/1211* (2013.01); *B67D 1/00* (2013.01); *B67D 1/0872* (2013.01); *E03C 1/0404* (2013.01); *E03C 1/0408* (2013.01); *E03C 1/057* (2013.01); *E03C 1/14* (2013.01); *G02B 6/0005* (2013.01); *G06F 3/011* (2013.01); *G06F 3/017* (2013.01); *G06F 3/0304* (2013.01); *G06F 3/048* (2013.01); *G06F 3/0482* (2013.01); *G06F 3/167* (2013.01); *A47K 2210/00* (2013.01); *E03C 1/046* (2013.01); *E03C 2001/0418* (2013.01); *G06F 3/04817* (2013.01); *G06F 2203/04101* (2013.01)

(58) Field of Classification Search
CPC ...... G06F 3/011; G06F 3/017; G06F 3/03043; G06F 3/018; G06F 2203/04101; A47K 2210/00; A47K 5/1217
USPC ............................................................ 4/623
See application file for complete search history.

(56) References Cited

U.S. PATENT DOCUMENTS

| | | |
|---|---|---|
| 3,829,675 A | 8/1974 | Mariani |
| 4,765,701 A | 8/1988 | Cheslak |

(Continued)

FOREIGN PATENT DOCUMENTS

| | | |
|---|---|---|
| WO | 2013138164 | 9/2013 |
| WO | 2015057564 | 4/2015 |

*Primary Examiner* — Lauren Crane
(74) *Attorney, Agent, or Firm* — Thorpe North and Western

(57) ABSTRACT

The invention provides a bathroom fixture in the form of an electronic mirror with a touchlessly operated fluid dispenser. The device provides visual cues to assist in the touchless operation thereof.

20 Claims, 29 Drawing Sheets

(51) Int. Cl.
 A47K 3/28 (2006.01)
 G06F 3/0481 (2013.01)
 E03C 1/046 (2006.01)

(56) References Cited

U.S. PATENT DOCUMENTS

| | | |
|---|---|---|
| 5,799,124 A | 8/1998 | Zorn et al. |
| 5,868,311 A * | 2/1999 | Cretu-Petra ............ E03C 1/057 236/12.12 |
| 6,560,027 B2 | 5/2003 | Meine |
| 6,840,655 B2 | 1/2005 | Shen |
| 7,984,825 B2 | 7/2011 | Ophardt et al. |
| 8,684,236 B2 | 4/2014 | Ophardt |
| 9,122,320 B1 * | 9/2015 | Rowles ................. G06F 3/0317 |
| 2007/0246550 A1 | 10/2007 | Rodenbeck et al. |
| 2011/0315711 A1 | 12/2011 | Hecht et al. |
| 2015/0000026 A1 * | 1/2015 | Clements ................ G06F 3/013 4/443 |
| 2015/0308089 A1 | 10/2015 | Thompson et al. |

* cited by examiner

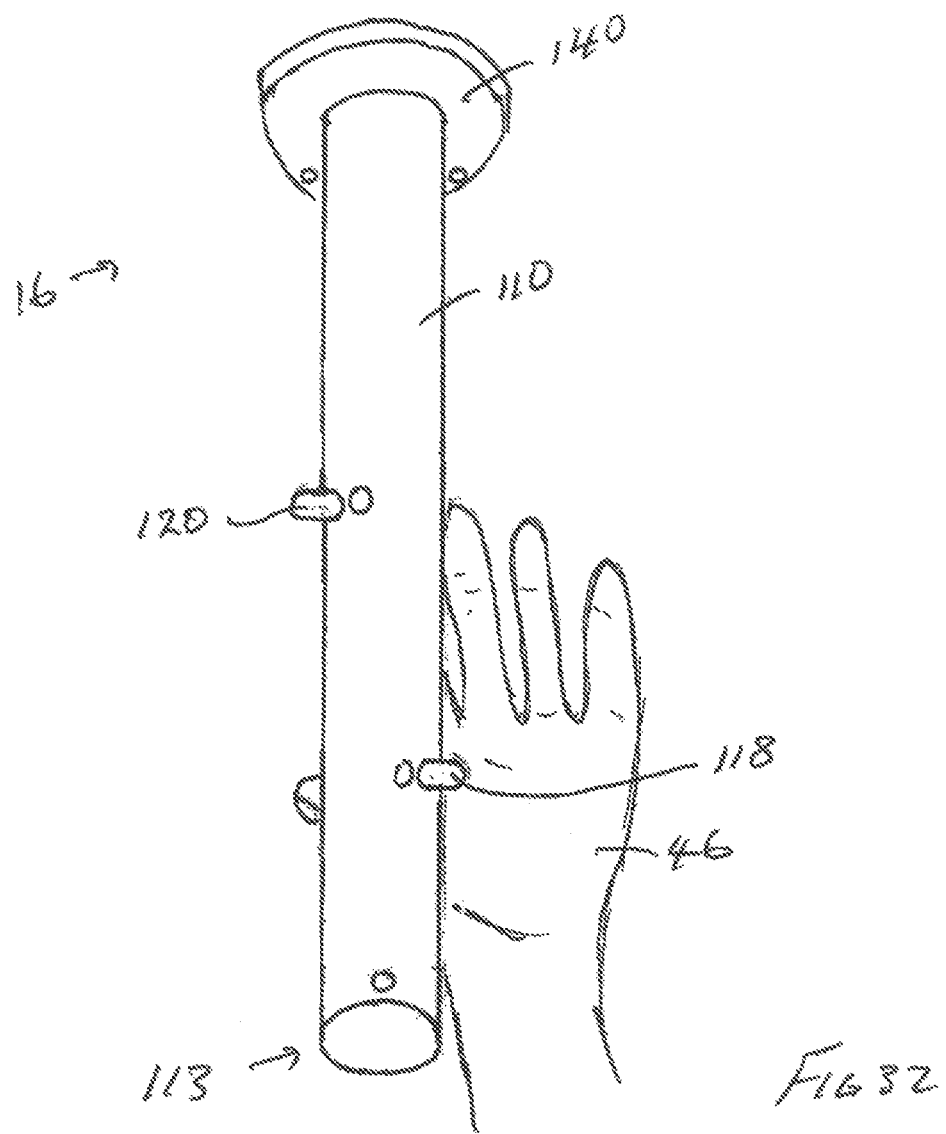

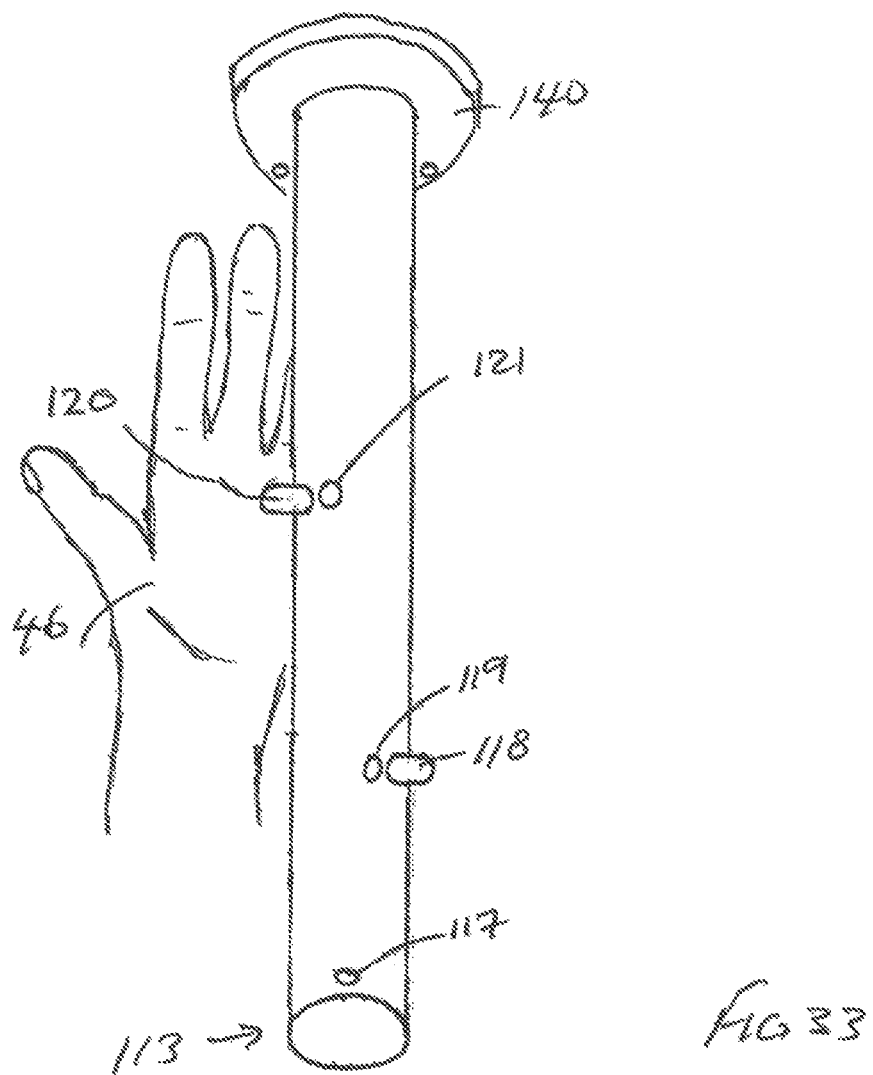

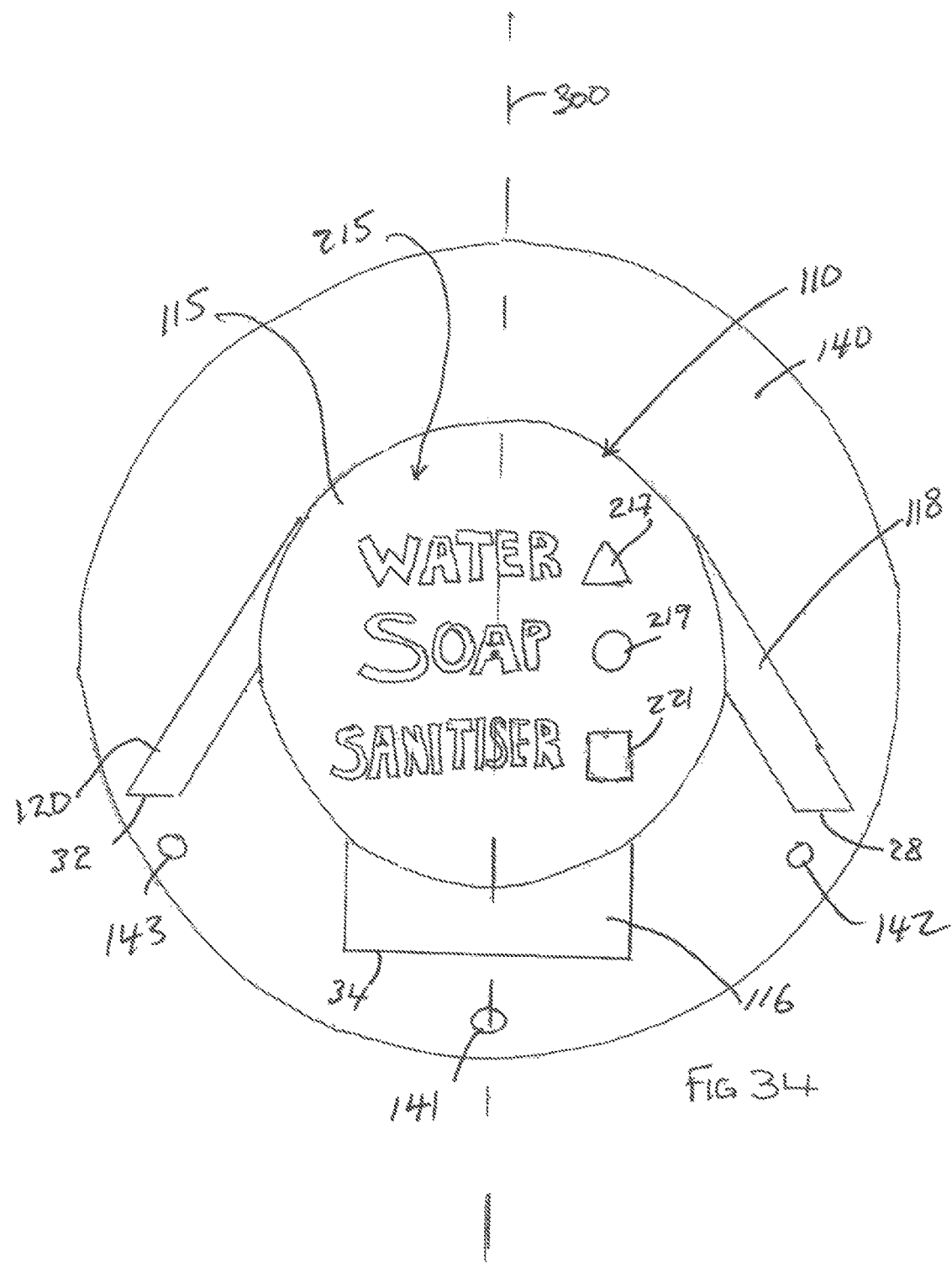

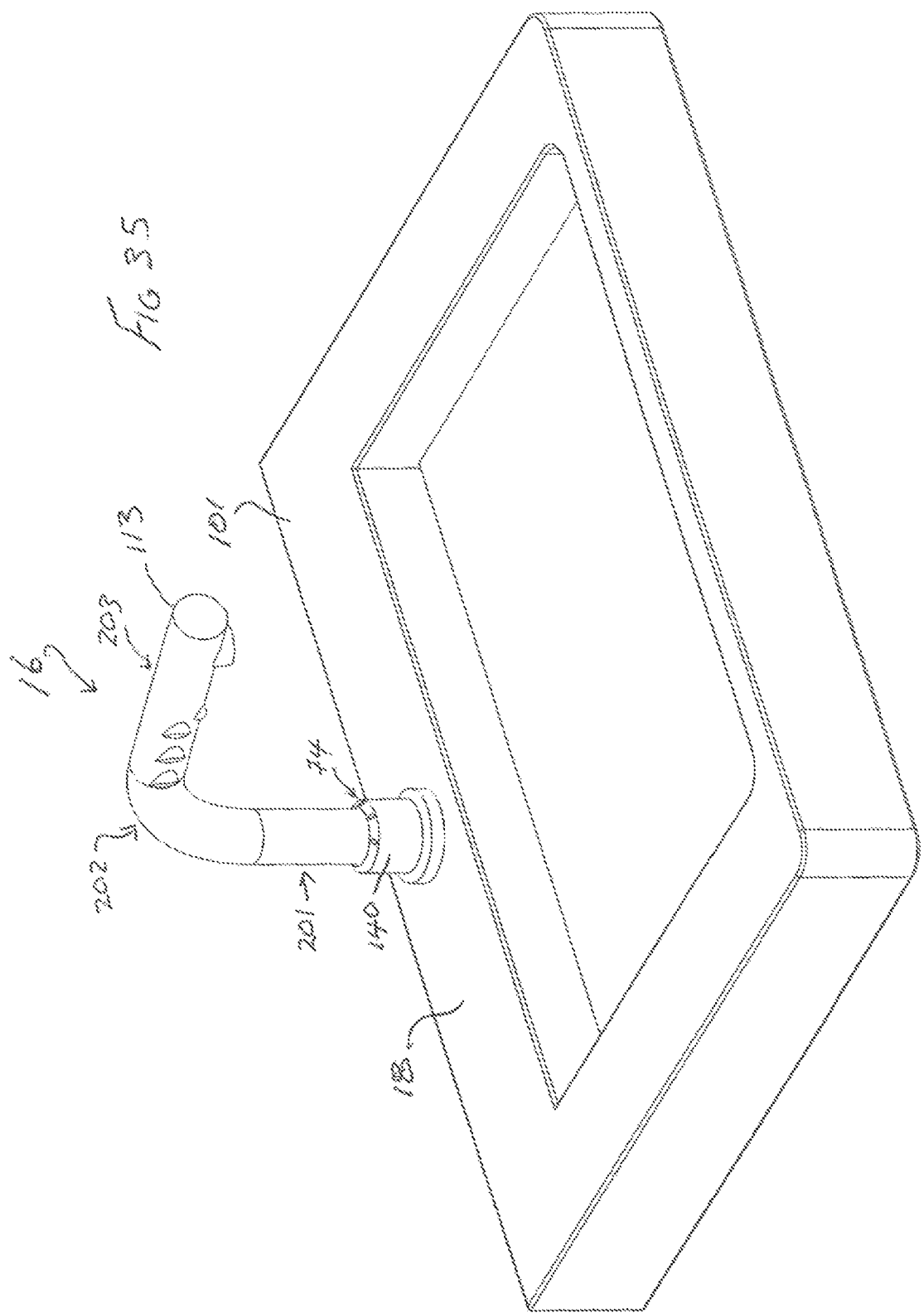

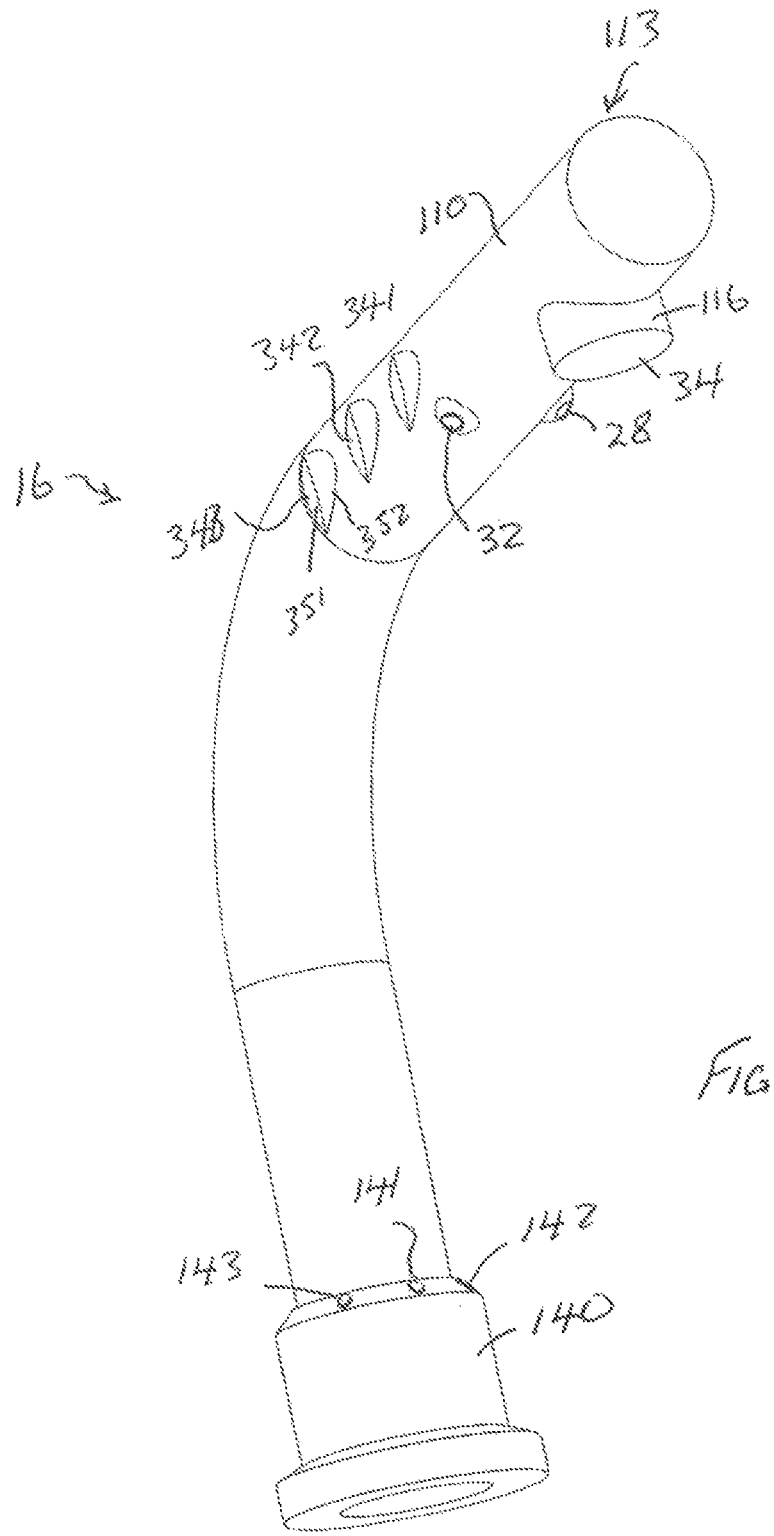

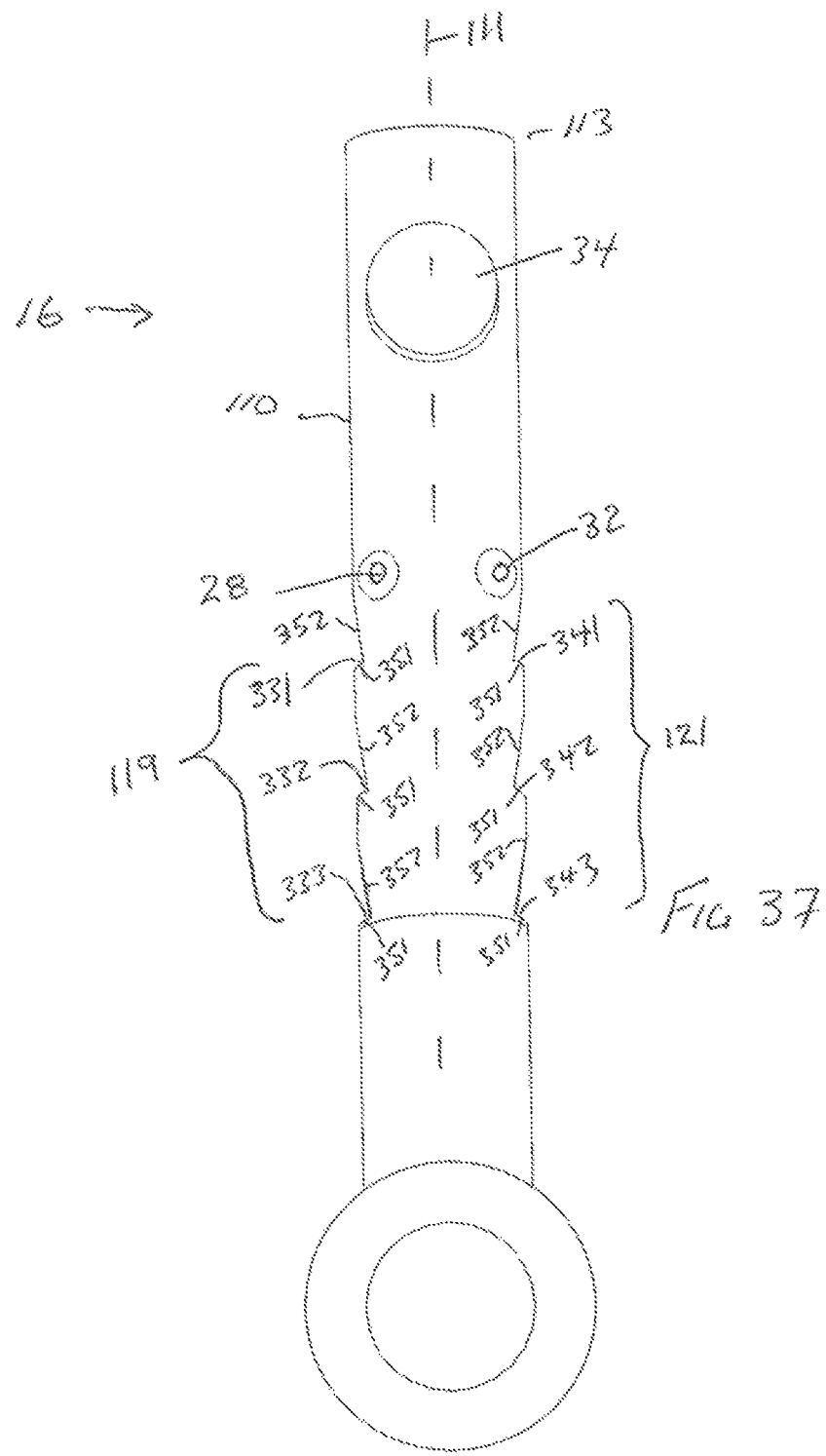

INTERACTIVE DISPLAY DEVICE

FIELD OF THE INVENTION

This invention relates to touchless devices, especially devices for dispensing fluids such as water, hand soap and hand sanitizer. More particularly, the invention provides a touchless device that provides visual cues to assist in the touchless operation thereof.

BACKGROUND OF THE INVENTION

Regular hand cleaning is important to reduce the spread of infectious diseases. To facilitate hand washing, most bathrooms are equipped with a water faucet and sink, together with a soap dispenser. These are typically installed below a bathroom mirror.

Manually operated faucets and soap dispensers may become contaminated by a user's hands, and thus provide a route for the spread of infectious agents. To avoid this, many public bathrooms use touchlessly operated faucets and soap dispensers. These are generally equipped with proximity sensors, and are configured to dispense water or soap when a user places his or her hands near the appropriate sensor.

Touchlessly operated hand cleaning equipment may, however, be difficult to operate, especially for individuals who are unfamiliar with the equipment. For example, an individual who is accustomed to manually operated faucets and soap dispensers may search in vain for a manual control, thereby contaminating the equipment with his hands. The individual may then leave the bathroom without washing his hands, further increasing the risk of spreading infectious agents. This problem may be particularly acute for those visiting from a foreign country, who may be accustomed to hand cleaning equipment having a significantly different design and mode of operation.

The present inventors have appreciated that the hand cleaning experience could be improved by providing a hand cleaning device that provides easily understood visual cues to assist users in the touchless operation thereof.

SUMMARY OF THE INVENTION

To at least partially overcome some of the disadvantages of previously known devices, in one aspect, the invention provides an enhanced bathroom mirror that incorporates a touchlessly operated fluid dispenser. The mirror comprises an electronic display that provides visual cues to assist in touchless operation of the dispenser. For example, the mirror may display icons representing different fluids that can be dispensed, such as water, soap, or hand sanitizer, together with animated graphics showing hand gestures that are used to select a fluid for dispensing. The mirror may also display videos that show how to operate the device.

The device may incorporate a light guide, which provides a path of light directing a user to place his hands below a dispenser outlet to receive the selected fluid. The light guide may, for example, comprise one or more LED lights arranged between the mirror and the dispenser outlet. The present inventors have appreciated that by providing these easily understood visual cues, the fluid dispenser can be readily operated by individuals who have never used it before.

In one aspect, the present invention provides a bathroom fixture which combines the functions of a mirror, a water faucet, and a soap dispenser, in a single, easy to use device. By incorporating multiple functions in one device having an intuitive, touchless mode of operation, the invention simplifies and enhances the hand cleaning experience.

In another aspect, the present invention provides an interactive display device incorporating additional visual cues to assist in the touchless operation thereof. For example, some embodiments of the invention use one or more sensors to track the location of a user's hand relative to the electronic display, and incorporate a computer system that displays a movable indicator on the electronic display which tracks the movement of the user's hand.

The movable indicator is designed to provide intuitive feedback which guides users in the touchless operation of the device. For example, the computer system may be configured to modify a visual characteristic of the movable indicator, such as its size or color, based on the distance of the user's hand from the electronic display. As the user's hand is moved towards the electronic display, the changing visual characteristic provides immediately recognizable feedback to the user. The user thus understands that the device is detecting and tracking his or her hand, and that the electronic display therefore does not need to be touched in order to be operated. This further helps to avoid unnecessary contact with the device and the associated risk of contamination and spread of disease. The interactive display device may incorporate an optical or electrical mirror display, and may be used to control a water faucet and soap dispenser. Alternatively, the device could be used for any other purpose for which touchless operation may be desired, such as controlling a television or a general purpose computer.

In a further aspect, the invention provides an interactive mirror display device that incorporates a one-way mirror, with an electronic display arranged behind the one-way mirror. The electronic display may be configured to display a graphic element, such as a selectable icon for dispensing water or soap, which is visible through the one-way mirror. The icons may be selected touchlessly by moving the user's hand to a position, in front of the one-way mirror, that is near the icon to be selected. This combination of a one-way mirror with an electronic display permits the device to provide an optical reflection. The device can thus function as a mirror without requiring the cameras and computer resources that would be necessary to electronically produce a mirror-like image.

In some embodiments, the electronic display is spaced from the one-way mirror, so that the graphic elements appear, to a user facing the one-way mirror, to be located behind the mirror. Because the graphic element is located behind the mirror, it is apparent to the user that the graphic element cannot be physically touched, and the user is thus discouraged from touching the surface of the mirror. Furthermore, when the user's hand is spaced from the mirror at an appropriate location, the reflection of the user's hand appears to contact or intersect with the graphic element behind the mirror. The user is thus intuitively encouraged to place his or her hand at this location, further discouraging unnecessary contact with the mirror.

Accordingly, in one aspect the present invention resides in a fluid dispensing device comprising: an electronic mirror configured to display a reflection in conjunction with computer generated graphics; a camera configured to capture images of a user in front of the mirror; a computer configured to receive the images captured by the camera, and determine the position of the user's hand based on the images; a reservoir for containing hand cleaner fluid to be dispensed; a water supply valve, connected to a water supply, for controlling a flow of water to be dispensed; a dispenser outlet for discharge of the hand cleaner fluid and the water; a discharge mechanism operable to discharge an allotment of the hand cleaner fluid from the dispenser outlet when activated; and a light guide running between the mirror and the dispenser outlet; wherein the electronic mirror is configured to display a graphic representing the hand cleaner fluid and a graphic representing the water; wherein the computer is configured to identify the graphic representing the hand cleaner fluid or the graphic representing the water as a selected graphic based on the position of the user's hand relative to the graphic representing the hand cleaner fluid and the graphic representing the water; wherein the electronic mirror and the light guide are configured to provide a path of light between the selected graphic and the dispenser outlet; and wherein the computer is configured to activate the discharge mechanism when the graphic representing the hand cleaner fluid is selected, and to open the water supply valve when the graphic representing the water is selected.

In another aspect, the present invention resides in an interactive display device comprising: an electronic display configured to display graphics; at least one sensor configured to detect an object placed in proximity to the electronic display; and a computer system configured to determine a location of the object relative to the electronic display based on detection data received from the at least one sensor; wherein, when the location of the object is determined to be within a preselected zone, the computer system is configured to display a movable indicator on the electronic display at a position that tracks the location of the object relative to the electronic display; and wherein the computer system is configured to modify a visual characteristic of the movable indicator based on a distance of the object from the electronic display.

In a further aspect, the present invention resides in an interactive mirror display device comprising: a one-way mirror; an electronic display arranged behind the one-way mirror, and configured to display a graphic element that is visible through the one-way mirror; at least one sensor configured to detect an object placed in proximity to the one-way mirror; and a computer system configured to determine a location of the object relative to the one-way mirror based on detection data received from the at least one sensor; wherein the computer system is configured to perform an action when the location of the object is determined to be within a preselected zone in proximity to the graphic element.

In a 1st configuration, the present invention provides an interactive display device comprising:

an electronic display configured to display graphics including at least one graphic element;

at least one sensor configured to detect an object placed in proximity to the electronic display; and a computer system configured to determine a location of the object relative to the electronic display based on detection data received from the at least one sensor;

wherein the computer system is configured to perform an action when the location of the object is determined to be within a preselected zone in proximity to the graphic element.

In a $2^{nd}$ configuration, the present invention provides the interactive mirror display device according to the $1^{st}$ configuration including a one-way mirror;

the electronic display arranged behind the one-way mirror, and configured to display the graphic element visible through the one-way mirror.

In a $3^{rd}$ configuration, the present invention provides the interactive mirror display device according to the $2^{nd}$ configuration wherein the electronic display is spaced from the one-way mirror so that the graphic element appears to a user facing the one-way mirror, to be located a preselected distance behind the one-way mirror; and wherein the preselected zone includes a position where a reflected image of the object, as seen by the user facing the one-way mirror, appears to contact or intersect with the graphic element.

In a $4^{th}$ configuration, the present invention provides the interactive mirror display device according to the $1^{st}$, $2^{nd}$ or $3^{rd}$ configuration wherein the computer system is configured to modify a visual characteristic of the graphic element when it is determined that the object is located at the position.

In a $5^{th}$ configuration, the present invention provides the interactive mirror display device according to any one of the $1^{st}$ to $4^{th}$ configurations wherein, when the location of the object is determined to be within the preselected zone, the computer system is configured to display a movable indicator on the electronic display at a position that tracks the location of the object relative to the electronic display.

In a $6^{th}$ configuration, the present invention provides the interactive mirror display device according to the $5^{th}$ configuration wherein the computer system is configured to modify a visual characteristic of the movable indicator based on a distance of the object from the electronic display.

In a $7^{th}$ configuration, the present invention provides the interactive display device according to the $5^{th}$ or $6^{th}$ configuration wherein the computer system is configured to cause the movable indicator to disappear from the electronic display when the object is moved out of the preselected zone, and to reappear when the object is returned to the preselected zone.

In an $8^{th}$ configuration, the present invention provides the interactive display device according to the $5^{th}$, $6^{th}$ or $7^{th}$ configuration wherein the computer system is configured to increase a size of the movable indicator when the object is moved closer to the electronic display, and to decrease the size of the movable indicator when the object is moved away from the electronic display.

In a $9^{th}$ configuration, the present invention provides the interactive display device according to any one of the $6^{th}$ to $8^{th}$ configurations wherein the movable indicator comprises a simulated three-dimensional distortion; and wherein the computer system is configured to increase a degree of distortion of the movable indicator when the object is moved closer to the electronic display, and to decrease the degree of distortion of the movable indicator when the object is moved away from the electronic display.

In a $10^{th}$ configuration, the present invention provides the interactive display device according to any one of the $5^{th}$ to $9^{th}$ configurations wherein the movable indicator comprises an array of graphic elements, and the computer system is configured to increase a number of said graphic elements when the object is moved closer to the electronic display, and to decrease the number of said graphic elements when the object is moved away from the electronic display.

In an $11^{th}$ configuration, the present invention provides the interactive display device according to the $10^{th}$ configuration wherein each of the graphic elements has a size, and the size of the graphic elements is greatest at a central area of the array; and wherein the computer system is configured to increase the size of the graphic elements when the object is moved closer to the electronic display, and to decrease the size the graphic elements when the object is moved away from the electronic display.

In a 12th configuration, the present invention provides the interactive display device according to any one of the 1st to 11th configurations wherein, when the location of the object is determined to be within a preselected distance of the electronic display, the computer system is configured to produce an alert for discouraging a user from touching the electronic display.

In a 13th configuration, the present invention provides the interactive display device according to any one of the 5th to 12th configurations wherein the computer system is configured to display an interaction element on the electronic display, and to perform an action when the movable indicator is positioned on or in proximity to the interaction element.

In a 14th configuration, the present invention provides the interactive display device according to any one of the 1st to 13th configurations wherein the object is a user's hand.

In a 15th configuration, the present invention provides the interactive display device according to any one of the 7th to 14th configurations wherein the computer system is configured to control a material dispenser,
the preselected zone comprises a material preselected zone;
wherein the computer system is configured to display a selectable material icon on the electronic display;
wherein the computer system is configured to activate the material dispenser to dispense material when the object is determined to be within the material preselected zone in proximity to the selectable hand cleaner icon.

In a 16th configuration, the present invention provides the interactive display device according to any one of the 1st to 14th configurations including:
a material dispenser outlet for discharge of a material;
a material dispenser operable when activated to discharge the material out the material dispenser outlet; and
a light guide running between the display and the material dispenser outlet;
wherein the display is configured to display a graphic representing the material;
the computer is configured to identify the graphic representing the material as a selected graphic based on the position of the object relative to the graphic representing the material;
the display and the light guide are configured to provide a path of light between the selected graphic and the material dispenser outlet; and
the computer is configured to activate the material discharge mechanism when the graphic representing the material dispenser is the selected graphic.

In a 17th configuration, the present invention provides the interactive display device of the 15th configuration in combination with the material dispenser, wherein the material dispenser has a material discharge outlet for discharge of the material,
wherein the object is a first hand of a person,
the material outlet located relative to the electronic display such that when the location of the first hand is determined to be within a preselected zone in proximity to the graphic element, a second hand of the person is capable of being placed at the material discharge outlet to receive material discharged by the material dispenser.

In an 18th configuration, the present invention provides the interactive display device according to the 17th configuration including:
a material dispenser outlet for discharge of a material;
a material dispenser operable when activated to discharge the material out the material dispenser outlet; and
a light guide running between the display and the material dispenser outlet;
wherein the display is configured to display a graphic representing the material;
the computer is configured to identify the graphic representing the material as a selected graphic based on the position of the object relative to the graphic representing the material;
the display and the light guide are configured to provide a path of light between the selected graphic and the material dispenser outlet; and
the computer is configured to activate the material discharge mechanism when the graphic representing the material dispenser is the selected graphic.

In a 19th configuration, the present invention provides the interactive display device according to any one of the 1st to 14th configurations in combination with a plurality of material dispensers, wherein each material dispenser has a material discharge outlet for discharge of a respective material,
wherein the object is a first hand of a person,
each material outlet located relative to the electronic display such that when the location of the first hand is determined to be within a preselected zone in proximity to the graphic element, a second hand of the person is capable of being placed at each material discharge outlet to receive respective material discharged by each material dispenser.

In a 20th configuration, the present invention provides the interactive display device according to the 19th configuration wherein the display is configured to display a graphic representing the material including:
a plurality of light guides with one light guide running between the graphic representing each material and each respective dispenser outlet;
the computer is configured to identify the graphic representing each material as a selected graphic based on the position of the object relative to the graphic representing the material;
the display and each light guide are configured to provide a path of light between the selected graphic and the respective material dispenser outlet; and
the computer is configured to activate each material discharge mechanism when the graphic representing the respective material dispenser is the selected graphic.

In a 21st configuration, the present invention provides the interactive display device of the 15th to 20th configurations wherein the material dispenser is selected from the group of a water dispenser, a hand cleaner dispenser, a hand lotion dispenser and a drying air dispenser.

In a 22nd configuration, the present invention provides the interactive display device according to any one of the 1st to 14th configurations wherein the computer system is configured to control a hand cleaner dispenser,
the preselected zone comprises a hand cleaner preselected zone;
wherein the computer system is configured to display a selectable hand cleaner icon on the electronic display;
wherein the computer system is configured to activate the hand cleaner dispenser to dispense hand cleaner when the object is determined to be within the hand cleaner preselected zone in proximity to the selectable hand cleaner icon.

In a 23rd configuration, the present invention provides the interactive display device of the 22nd configuration in combination with the hand cleaner dispenser, wherein the hand cleaner has a hand cleaner discharge outlet for discharge of the hand cleaner,
wherein the object is a first hand of a person, the hand cleaner outlet located relative to the electronic display such that when the location of the first hand is determined to be within a preselected zone in proximity to the graphic element, a second hand of the person is capable of being placed underneath the hand cleaner discharge outlet to receive hand cleaner discharged by the hand cleaner dispenser.

In a 24$^{th}$ configuration, the present invention provides the interactive display device according to any one of the 1$^{st}$ to 14$^{th}$, 22$^{nd}$ and 23$^{rd}$ configurations wherein:

the computer system is configured to control a water dispenser;

the graphic element comprises a selectable water icon and the preselected zone comprises a water preselected zone;

the computer system is configured to display a selectable water icon on the electronic display, and the computer system is configured to activate the water dispenser to dispense water when the object is determined to be within the water preselected zone.

In a 25$^{th}$ configuration, the present invention provides the interactive display device of the 24$^{th}$ configuration in combination with the water dispenser, wherein the water dispenser has a water discharge outlet for discharge of the water, and the object is a first hand of a person, the water discharge outlet located relative to the electronic display such that when the location of the first hand is determined to be within a preselected zone in proximity to the graphic element, a second hand of the person is capable of being placed underneath the water discharge outlet to receive water discharged by the water dispenser.

In a 26$^{th}$ configuration, the present invention provides the interactive display device according to any one of the 1$^{st}$ to 25$^{th}$ configurations wherein the electronic display also displays to a user in front of the electronic display an image of the user in front of the electronic display.

In a 27$^{th}$ configuration, the present invention provides the interactive display device according to any one of the 1$^{st}$ to 26$^{th}$ configurations including a camera configured to capture images of the user in front of the mirror;

wherein the computer is configured to receive the images captured by the camera, and determine the position of the object based on the images.

In a 28$^{th}$ configuration, the present invention provides a material dispensing device comprising:

an electronic display configured to display to a user in front of the electronic display computer generated graphics;

at least one sensor configured to detect an object placed in proximity to the electronic display;

a computer system configured to determine a location of the object relative to the electronic display based on detection data received from the at least one sensor, a material dispenser outlet for discharge of a material;

a material dispenser operable to discharge the material when activated; and a light guide running between the mirror and the material dispenser outlet;

wherein the electronic display is configured to display a graphic representing the material;

wherein the computer is configured to identify the graphic representing the material as a selected graphic based on the position of the object relative to the graphic representing the material;

wherein the electronic mirror and the light guide are configured to provide a path of light between the selected graphic and the dispenser outlet; and wherein the computer is configured to activate the material discharge mechanism when the graphic representing the material dispenser is the selected graphic.

In a 29$^{th}$ configuration, the present invention provides the material dispensing device of the 28$^{th}$ configuration wherein the electronic display also displays to the user in front of the electronic display an image of the user.

In a 30$^{th}$ configuration, the present invention provides the material dispensing device of the 28$^{th}$ or 29$^{th}$ configuration wherein the material dispenser comprises a plurality of material dispensers, wherein each material dispenser has a respective material discharge outlet for discharge of a respective material, wherein the object is a first hand of a person, each material outlet located relative to the electronic display such that when the location of the first hand is determined to be within a preselected zone in proximity to the graphic element, a second hand of the person is capable of being placed at each material discharge outlet to receive respective material discharged by each material dispenser.

In a 31$^{st}$ configuration, the present invention provides the interactive display device of the 30$^{th}$ configuration wherein the material is selected from the group of water, a hand cleaner, a hand lotion and drying air.

In a 32$^{nd}$ configuration, the present invention provides an interactive display device comprising:

an electronic display configured to display graphics;

at least one sensor configured to detect an object placed in proximity to the electronic display; and a computer system configured to determine a location of the object relative to the electronic display based on detection data received from the at least one sensor;

wherein, when the location of the object is determined to be within a preselected zone, the computer system is configured to display a movable indicator on the electronic display at a position that tracks the location of the object relative to the electronic display; and wherein the computer system is configured to modify a visual characteristic of the movable indicator based on a distance of the object from the electronic display.

In a 33$^{rd}$ configuration, the present invention provides the interactive display device according to the 32$^{nd}$ configuration wherein the computer system is configured to cause the movable indicator to disappear from the electronic display when the object is moved out of the preselected zone, and to reappear when the object is returned to the preselected zone.

In a 34$^{th}$ configuration, the present invention provides the interactive display device according to the 32$^{nd}$ or 33$^{rd}$ configuration wherein the computer system is configured to increase a size of the movable indicator when the object is moved closer to the electronic display, and to decrease the size of the movable indicator when the object is moved away from the electronic display.

In a 35$^{th}$ configuration, the present invention provides the interactive display device according to the 32$^{nd}$ or 33$^{rd}$ wherein the movable indicator comprises an array of graphic elements, and the computer system is configured to increase a number of said graphic elements when the object is moved closer to the electronic display, and to decrease the number of said graphic elements when the object is moved away from the electronic display.

In a 36$^{th}$ configuration, the present invention provides the interactive display device according to the 35$^{th}$ configuration wherein each of the graphic elements has a size, and the size of the graphic elements is greatest at a central area of the array; and wherein the computer system is configured to increase the size of the graphic elements when the object is moved closer to the electronic display, and to decrease the size the graphic elements when the object is moved away from the electronic display.

In a 37$^{th}$ configuration, the present invention provides the interactive display device according to any one of the 32$^{nd}$ to 36$^{th}$ configurations wherein, when the location of the object is determined to be within a preselected distance of the electronic display, the computer system is configured to produce an alert for discouraging a user from touching the electronic display.

In a 38$^{th}$ configuration, the present invention provides the interactive display device according to any one of the 32$^{nd}$ to 37$^{th}$ configurations wherein the computer system is configured to display an interaction element on the electronic display, and to perform an action when the movable indicator is positioned on or in proximity to the interaction element.

In a 39$^{th}$ configuration, the present invention provides the interactive display device according to any one of the 32$^{nd}$ to 38$^{th}$ configurations wherein the computer system is configured to control a water dispenser and a hand cleaner dispenser;

wherein the computer system is configured to display a selectable water icon and a selectable hand cleaner icon on the electronic display;

wherein the computer system is configured to activate the water dispenser to dispense water when the movable indicator is positioned on or in proximity to the selectable water icon; and wherein the computer system is configured to activate the hand cleaner dispenser to dispense hand cleaner when the movable indicator is positioned on or in proximity to the selectable hand cleaner icon.

In a 40$^{th}$ configuration, the present invention provides the interactive display device according to any one of the 32$^{nd}$ to 39$^{th}$ configurations wherein the movable indicator comprises a simulated three-dimensional distortion; and wherein the computer system is configured to increase a degree of distortion of the movable indicator when the object is moved closer to the electronic display, and to decrease the degree of distortion of the movable indicator when the object is moved away from the electronic display.

In a 41$^{st}$ configuration, the present invention provides a material dispensing device comprising:

an electronic display configured to display to a user in front of the electronic display computer generated graphics;

at least one sensor configured to detect an object placed in proximity to the electronic display;

a computer system configured to determine a position of the object relative to the electronic display based on detection data received from the at least one sensor, at least one material dispenser outlet, at least one material dispenser operable when activated to discharge the at least one material from at least one material dispenser outlet; and wherein the electronic display is configured to display as the computer generated graphics at least one graphic element representing the least one material;

wherein the computer system is configured to activate the at least one material discharge mechanism when the position of the object is determined to be within a preselected zone in proximity to the at least one graphic element.

In a 42$^{nd}$ configuration, the present invention provides the material dispensing device according to the 41$^{st}$ configuration wherein:

the at least one material includes a first material, the at least one material dispenser outlet includes a first material dispenser outlet, the at least one material dispenser includes a first material dispenser operable when activated to discharge the first material from the first material dispenser outlet;

wherein the electronic display is configured to display as the computer generated graphics as the at least one graphic element a first graphic element representing the first material;

wherein the computer system is configured to activate the first material discharge mechanism when the position of the object is determined to be within a preselected zone in proximity to the first graphic element.

In a 43$^{rd}$ configuration, the present invention provides the material dispensing device according to the 42$^{nd}$ configuration wherein:

the at least one material includes a second material, the at least one material dispenser outlet includes a second material dispenser outlet, the at least one material dispenser includes a second material dispenser operable when activated to discharge the second material from the second material dispenser outlet;

wherein the electronic display is configured to display as the computer generated graphics as the at least one graphic element a second graphic element representing the second material;

wherein the computer system is configured to activate the second material discharge mechanism when the position of the object is determined to be within a preselected zone in proximity to the second graphic element.

In a 44$^{th}$ configuration, the present invention provides the material dispensing device according to the 43$^{rd}$ configuration wherein:

the at least one material includes a third material, the at least one material dispenser outlet includes a third material dispenser outlet, the at least one material dispenser includes a third material dispenser operable when activated to discharge the third material from the third material dispenser outlet;

wherein the electronic display is configured to display as the computer generated graphics as the at least one graphic element a third graphic element representing the third material; and the computer system is configured to activate the third material discharge mechanism when the position of the object is determined to be within a preselected zone in proximity to the third graphic element.

In a 45$^{th}$ configuration, the present invention provides the material dispensing device according to any one of the 41$^{st}$ to 44$^{th}$ configurations wherein the at least one material is a material capable of flowing selected from the group of water, a first-hand cleaner, second hand cleaner, a hand lotion and drying air.

In a 46$^{th}$ configuration, the present invention provides the material dispensing device according to the 43$^{rd}$ or 44$^{th}$ configuration wherein:

the second material comprises a second hand cleaning fluid, the second material dispenser comprises a second hand cleaning fluid reservoir containing the hand cleaning fluid and a second hand cleaning fluid pump operable to discharge the second hand cleaning fluid from the second hand cleaning fluid reservoir out the second material dispenser outlet for the second hand cleaning fluid.

In a 47th configuration, the present invention provides the material dispensing device according to the 43rd or 44th configuration wherein:

the second material comprises water, the second material dispenser a water supply supplying the water and a water valve controlling the discharge of the water from the second material dispenser outlet.

In a 48th configuration, the present invention provides the material dispensing device according to any one of the 42nd to 44th configurations and 46th and 47th configurations wherein:

the first material comprises a first-hand cleaning fluid, the first material dispenser comprises a first-hand cleaning fluid reservoir containing the hand cleaning fluid and a first-hand cleaning fluid pump operable to discharge the first hand cleaning fluid from the first hand cleaning fluid reservoir out the first material dispenser outlet for the first hand cleaning fluid.

In a 49th configuration, the present invention provides the material dispensing device according to any one of the 41st to 48th configurations wherein:

the object is a first hand of the user, the at least one material outlet located relative to the electronic display such that when the position of the first hand is determined to be within the preselected zone in proximity to the at least one graphic element a second hand of the user is capable of being placed at the at least one material discharge outlet to receive the at least one material discharged by the at least one material dispenser.

In a 50th configuration, the present invention provides the material dispensing device according to any one of the 41st to 49th configurations including:

an upwardly open basin, the basin disposed below the electronic display, the at least one material dispenser outlet located for discharge of the at least one respective material into the basin with space between the at least one material dispenser outlet and the basin for the user's hands to be placed under the at least one material dispenser outlet to receive the at least one material dispensed.

In a 51st configuration, the present invention provides the material dispensing device according to any one of the 41st to 50th configurations wherein:

the computer is configured to identify the at least one graphic element representing the at least one material as a selected graphic based on the position of the object relative to the at least one graphic element representing the at least one material; and the computer is configured to activate the at least one material discharge mechanism when the at least one graphic element representing the at least one material dispenser is the selected graphic and the location of the object is determined to be within the preselected zone in proximity to the at least one graphic element.

In a 52nd configuration, the present invention provides the material dispensing device according to any one of the 41st to 51st configurations including:

at least one light guide running between the electronic display and the at least one material dispenser outlet;

wherein the electronic display and the at least one light guide are configured to provide at least one path of light between the selected graphic and the at least one dispenser outlet.

In a 53rd configuration, the present invention provides the material dispensing device according to the 52nd configuration wherein the at least one path of light between the selected graphic and the at least one dispenser outlet is illuminated as a function of when the position of the object is determined to be within the preselected zone in proximity to the at least one graphic element.

In a 54th configuration, the present invention provides the material dispensing device according to any one of the 41st to 53rd configurations including an imaging device that displays to the user in front of the electronic display an image of the user.

In a 55th configuration, the present invention provides the material dispensing device according to the 54th configuration wherein the imaging device is selected from the group consisting of:

(a) the electronic display which displays to the user in front of the electronic display the image of the user as an electronic image of the user, and (b) a one-way mirror that displays to the user in front of the electronic display the image of the user as a reflected image of the user with the electronic display is arranged behind the one-way mirror, and configured to display the computer generated graphics visible through the one-way mirror.

In a 56th configuration, the present invention provides the material dispensing device according to the 54th configuration wherein the imaging device comprises an electronic display which displays to the user in front of the electronic display the image of the user as an electronic image of the user.

In a 57th configuration, the present invention provides the material dispensing device according to the 54th configuration wherein the imaging device comprises a one-way mirror that displays to the user in front of the electronic display the image of the user as a reflected image of the user;

the electronic display is arranged behind the one-way mirror, and configured to display the computer generated graphics visible through the one-way mirror.

In a 58th configuration, the present invention provides the material dispensing device according to the 17th configuration wherein the electronic display is spaced from the one-way mirror so that the at least one graphic element appears to a user facing the one-way mirror, to be located a preselected distance behind the one-way mirror; and wherein the preselected zone includes a position where the reflected image of the object, as seen by the user facing the one-way mirror, appears to contact or intersect with the at least one graphic element.

In a 59th configuration, the present invention provides a fluid dispensing arrangement for dispensing two fluids comprising:

a discharge spout, a first material dispensing mechanism for dispensing a first material from a first discharge outlet on the spout at a first location, a second material dispensing mechanism for dispensing a second material from a second discharge outlet on the spout at second location on the spout different than the first location, a sensor arrangement to sense the position of a user's hand relative to the spout and the first location and the second location, a controller, the controller activating dispensing from the first outlet when the user's hand is sensed proximate to the first outlet and activating dispensing from the second outlet when the user's hand is sensed proximate to the second outlet.

In a 60th configuration, the present invention provides a fluid dispensing arrangement according to the 59th configuration wherein the spout extends to a distal end, proximate the distal end, the spout is elongate extending along a longitudinal and presents a right side surface, a left side surface and a bottom surface, the first discharge outlet provided on a first surface selected from the group consisting of the right side surface, the left side surface and the bottom surface, the second discharge outlet provided on a second surface selected from the right side surface, the left side surface and the bottom surface that is not the first surface.

In a 61$^{st}$ configuration, the present invention provides a fluid dispensing arrangement according to the 59$^{th}$ or 60$^{th}$ configuration including:

a first visual indicia for the first discharge outlet that is visually apparent to a user and identifies the first location of the first discharge outlet, a second visual indicia for the second discharge outlet that is visually apparent to a user, identifies the second location of the second discharge outlet and is visually different than the first visual indicia that the user can distinguish between the second visual indicia and the first visual indicia.

In a 62$^{nd}$ configuration, the present invention provides a fluid dispensing arrangement according to the 61$^{st}$ configuration including:

a visual display visible to a user in front of the spout, the visual display including a first display indicia activated when the controller is dispensing the first material, and a second display indicia activated when the controller is dispensing the second material, the first display indicia having a first shared visual characteristic with the first visual indicia such that a user associates the first display indicia with the first visual indicia, and the second display indicia having a second shared visual characteristic with the second visual indicia such that a user associates the second display indicia with the second visual indicia, the second display indicia visually different than the first display indicia such that the user can distinguish between the second display indicia second and the first display indicia.

In a 63$^{rd}$ configuration, the present invention provides a fluid dispensing arrangement according to the 62$^{nd}$ configuration wherein:

the first shared visual characteristic includes a first color, and the second shared visual characteristic includes a second color different than the first color.

In a 64$^{th}$ configuration, the present invention provides a fluid dispensing arrangement according to the 62$^{nd}$ or 63$^{rd}$ configuration wherein:

the first shared visual characteristic includes a first shape, and the second shared visual characteristic includes a second shape different than the first shape.

In a 65$^{th}$ configuration, the present invention provides a fluid dispensing arrangement according to the 61$^{st}$, 62$^{nd}$ or 64$^{th}$ configuration wherein the visual display is on the distal end the spout.

In a 66$^{th}$ configuration, the present invention provides a fluid dispensing arrangement according to any one of the 59$^{th}$ to 65$^{th}$ configurations wherein the sensor arrangement includes a time of flight sensor.

In a 67$^{th}$ configuration, the present invention provides a fluid dispensing arrangement according to any one of the 59$^{th}$ to 65$^{th}$ configurations wherein the sensor arrangement includes a first time of flight to sense the position of a user's hand relative to the first location and a second time of flight to sense the position of a user's hand relative to the second location.

In a 68$^{th}$ configuration, the present invention provides a fluid dispensing arrangement according to the 58$^{th}$ configuration wherein:

the spout extends to a distal end, proximate the distal end, the spout is elongate extending along a longitudinal, the first discharge outlet provided on the spout proximate the distal end, and the second discharge outlet is provided on the spout spaced longitudinally rearward from the first discharge outlet.

In a 69$^{th}$ configuration, the present invention provides a fluid dispensing arrangement according to the 60$^{th}$ configuration wherein:

the first discharge outlet provided on the spout proximate the distal end, and the second discharge outlet is provided on the spout spaced longitudinally rearward from the first discharge outlet.

In a 70$^{th}$ configuration, the present invention provides a fluid dispensing arrangement according to the 59$^{th}$ or 60$^{th}$ configuration including:

a third material dispensing mechanism for dispensing a third material from a third discharge outlet on the spout at third location on the spout different than the first location and different than the second location, the sensor arrangement sensing the position of a user's hand relative to the spout and the third location, the controller activating dispensing from the third outlet when the user's hand is sensed proximate to the third location.

In a 71$^{st}$ configuration, the present invention provides a fluid dispensing arrangement according to the 70$^{th}$ configuration including:

a first visual indicia for the first discharge outlet that is visually apparent to a user and identifies the first location of the first discharge outlet, a second visual indicia for the second discharge outlet that is visually apparent to a user, identifies the second location of the second discharge outlet and is visually different than the first visual indicia that the user can distinguish between the second visual indicia and the first visual indicia, a third visual indicia for the third discharge outlet that is visually apparent to a user, identifies the third location of the third discharge outlet and is visually different from the first visual indicia and the second visual indicia that the user can distinguish between the third visual indicia and the first visual indicia and between the third visual indicia and the second visual indicia.

In a 72$^{nd}$ configuration, the present invention provides a fluid dispensing arrangement according to the 70$^{th}$ or 71$^{st}$ configuration wherein the spout extends to a distal end, proximate the distal end, the spout is elongate extending along a longitudinal and presents a right side surface, a left side surface and a bottom surface, the first discharge outlet provided on a first surface selected from the group consisting of the right side surface, the left side surface and the bottom surface, the second discharge outlet provided on a second surface selected from the right side surface, the left side surface and the bottom surface that is not the first surface, the third discharge outlet provided on third surface selected from the right side surface, the left side surface and the bottom surface that is not the first surface and is not the second surface.

In a 73rd configuration, the present invention provides a fluid dispensing arrangement according to the 70th or 71st configuration wherein:

the spout extends to a distal end, proximate the distal end, the spout is elongate extending along a longitudinal, the first discharge outlet provided on the spout proximate the distal end, and the second discharge outlet is provided on the spout spaced longitudinally rearward from the first discharge outlet.

In a 74th configuration, the present invention provides a fluid dispensing arrangement according to the 72nd configuration wherein:

the first discharge outlet provided on the spout proximate the distal end, and the second discharge outlet is provided on the spout spaced longitudinally rearward from the first discharge outlet.

BRIEF DESCRIPTION OF THE DRAWINGS

Further aspects and advantages of the invention will appear from the following description taken together with the accompanying drawings, in which:

FIG. 32 is a perspective view the same as FIG. 30 but showing a user's hand positioned below a soap dispensing outlet on the spout;

FIG. 33 is a perspective view the same as FIG. 30 but showing a user's hand positioned below a disinfectant fluid outlet on the spout;

FIG. 34 is a front view of a spout body shown in FIG. 28;

FIG. 35 is a pictorial view of a fluid dispensing device in accordance with an eighth embodiment of the present invention;

FIG. 36 a pictorial view of a spout of the fluid dispensing device of FIG. 35 as seen from the left side and below; and FIG. 37 is a bottom view of the spout of FIG. 35.

DETAILED DESCRIPTION OF THE DRAWINGS

Figure 1:
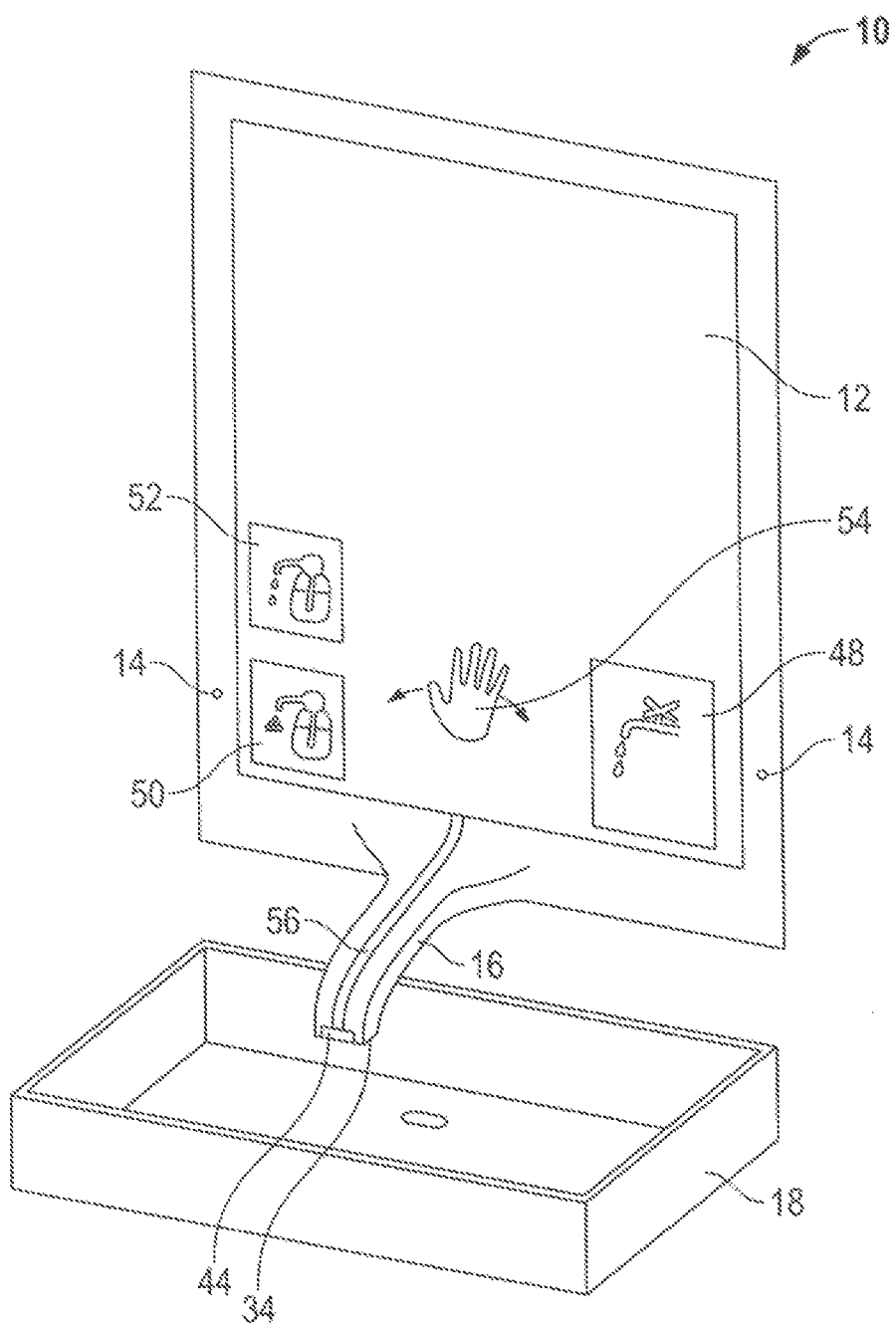
FIG. 1 shows a perspective view of a fluid dispensing device in accordance with a first preferred embodiment of the invention.
Figure 2:
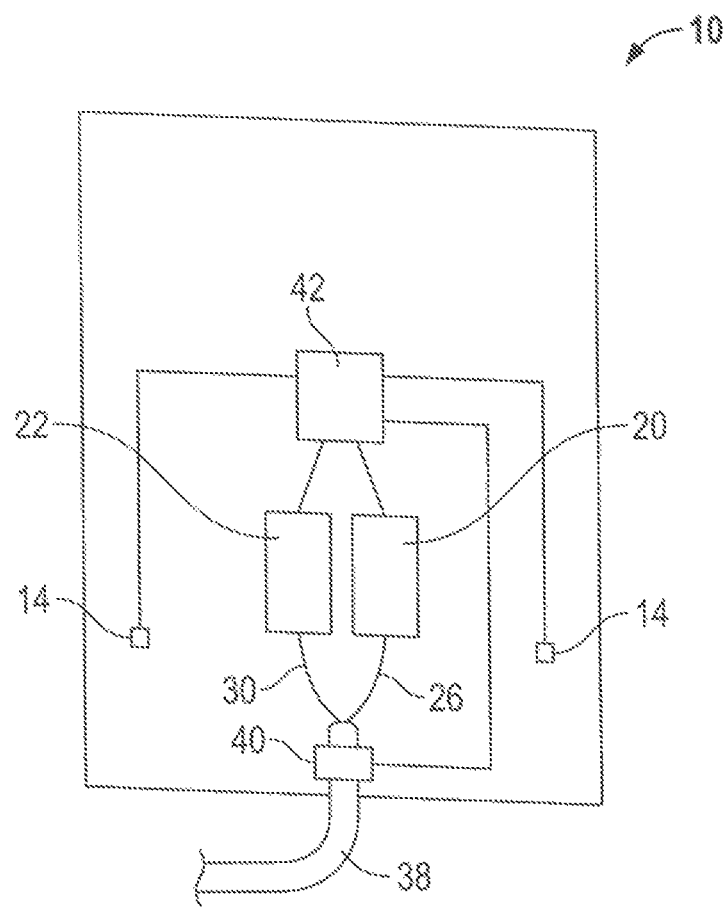
FIG. 2 shows a schematic rear view of the fluid dispensing device shown in FIG. 1.
Figure 3:
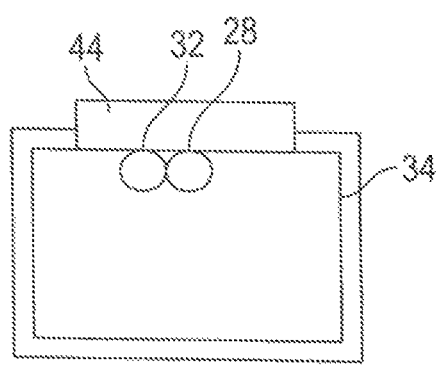
FIG. 3 shows a schematic bottom view of a fluid outlet of the fluid dispensing device shown in FIG. 1.

Reference is first made to FIGS. 1 to 3, which show a fluid dispensing device 10 in accordance with a first preferred embodiment of the invention. The device 10 includes an electronic mirror 12, two cameras 14 positioned on either side of the mirror 12, and an outwardly projecting spout body 16 for dispensing fluid. The device 10 is wall-mounted over a sink 18.

As is best shown in FIG. 2, at the rear of the device there is provided a soap dispenser 20 and a hand sanitizer dispenser 22. The soap dispenser 20 and hand sanitizer dispenser 22 may, for example, have a construction similar to the dispensers disclosed in U.S. Pat. No. 7,984,825 to Ophardt et al., issued Jul. 26, 2011, and in U.S. Pat. No. 8,684,236 to Ophardt, issued Apr. 1, 2014, both of which are incorporated herein by reference.

The soap dispenser 20 has a reservoir containing soap 24, and an electrically powered discharge mechanism operable to pump an allotment of the soap 24 through a soap discharge line 26 and out a soap outlet 28 upon activation. The hand sanitizer dispenser 22 likewise has a reservoir containing hand sanitizer, and an electrically powered discharge mechanism operable to pump an allotment of the hand sanitizer through a hand sanitizer discharge line 30 and out a hand sanitizer outlet 32 upon activation. The soap discharge line 26 and the hand sanitizer discharge line 30 pass from the rear of the device 10 into the outwardly projecting spout body 16, with the soap outlet 28 and the hand sanitizer outlet 32 positioned within a fluid outlet 34 of the spout body 16, as is shown in FIG. 3.

The device 10 also receives a supply of pressurized water 36 via a water pipe 38 mounted at the rear of the device 10. An electronically operated valve mechanism 40 controls the flow of water 36 into the device. When the valve 40 is open, water 36 flows through the spout body 16 and out through the fluid outlet 34.

A computer 42 is also mounted at the rear of the device 10, and controls the device's electronic components, including the discharge mechanism of the soap dispenser 20, the discharge mechanism of the hand sanitizer dispenser 22, the electronically operated valve mechanism 40, and the electronic mirror 12. The computer 42 receives data from the cameras 14, as well as from a proximity sensor 44 mounted near the fluid outlet 34 of the spout body 16. As will be described in more detail below, the computer 42 is operable to control the discharge of water 36, soap 24, and hand sanitizer from the fluid outlet 34 based on hand gestures that are detected by the cameras 14 and/or proximity sensor 44. The computer 42 is programmed to be capable of analyzing images captured by the cameras 14 to determine the three-dimensional position of a user's hand 46 relative to the device.

The electronic mirror 12 is configured to provide a reflection that is overlaid with additional computer generated images and information and may, for example, have a similar construction to the digital mirror described in U.S. Pat. No. 9,122,320 to Rowles et al., issued Sep. 1, 2015, which is hereby incorporated by reference. The reflection may be electronically generated based on images captured by the cameras 14. Alternatively, the mirror 12 may incorporate an optically reflective surface to provide a reflection. In some preferred embodiments of the invention, the mirror 12 incorporates an organic light-emitting diode (OLED) for displaying images.

As shown in FIG. 1, the electronic mirror 12 displays a Graphical User Interface (GUI) that includes icons representing each fluid that can be dispensed by the device 10, including a water icon 48, a soap icon 50, and a hand sanitizer icon 52. The mirror 12 can also display additional images, such as an animated hand icon 54 that is used to assist users in touchlessly operating the device 10.

The spout body 16 provides a conduit for transporting the fluids to be dispensed from the rear of the device 10 to a position over the sink 18 where a user can easily reach his hand 46. A proximity sensor 44 is positioned near the fluid outlet 34, and is configured to detect the presence of the user's hand 46 below the outlet 34. This information is communicated to the computer 42, and is used to control the dispensing of fluids.

The spout body 16 furthermore incorporates a light guide 56 that runs along the upper surface of the spout body 16 between the mirror 12 and the fluid outlet 34. The light guide 56 comprises one or more LED lights that are controlled by the computer 42. In some embodiments of the invention, the light guide 56 may comprise a light tube designed to transport and/or distribute light along its length. The light tube may have any desired shape or form, such as for example are described in U.S. Pat. No. 3,829,675 to Mariani, issued Aug. 13, 1974; U.S. Pat. No. 4,765,701 to Cheslak, issued Aug. 23, 1988; U.S. Pat. No. 5,799,124 to Zorn et al., issued Aug. 25, 1998; and U.S. Pat. No. 6,840,655 to Shen, issued Jan. 11, 2005, which are hereby incorporated by reference in their entirety. As will be described in more detail below, the light guide 56 is used as a visual cue to direct a user to place his hand 46 below the fluid outlet 34 to receive fluid therefrom.

The operation of the fluid dispensing device 10 will now be described with reference to FIGS. 1 and 4 to 7. Before a user approaches the device 10, to conserve energy the device 10 may enter a standby mode wherein limited graphics are displayed. When a user approaches, the user is detected by the cameras 14 and this information is communicated to the computer 42. The computer 42 then causes the mirror 12 to display a set of icons, including the water icon 48, the soap icon 50, the hand sanitizer icon 52, and the animated hand icon 54, as shown in FIG. 1. The mirror 12 may also display a greeting message, or the device 10 may emit an audible greeting or other sound to draw the user's attention to the mirror 12.

The animated hand icon 54 provides a visual cue to assist the user in touchlessly operating the device 10. In particular, the hand icon 54 moves toward each of the water icon 48, the soap icon 50, and the hand sanitizer icon 52. This suggests to the user that moving his hand 46 toward one of the icons 48, 50, 52 will select a fluid to be dispensed. For further emphasis, the fluid icons 48, 50, 52 may glow brighter or flash as the animated hand icon 54 moves toward them. In some embodiments of the invention, the mirror 12 may also display videos depicting how the device 10 is operated, or may provide audible instructions in addition to the visual cues.

Figure 4:
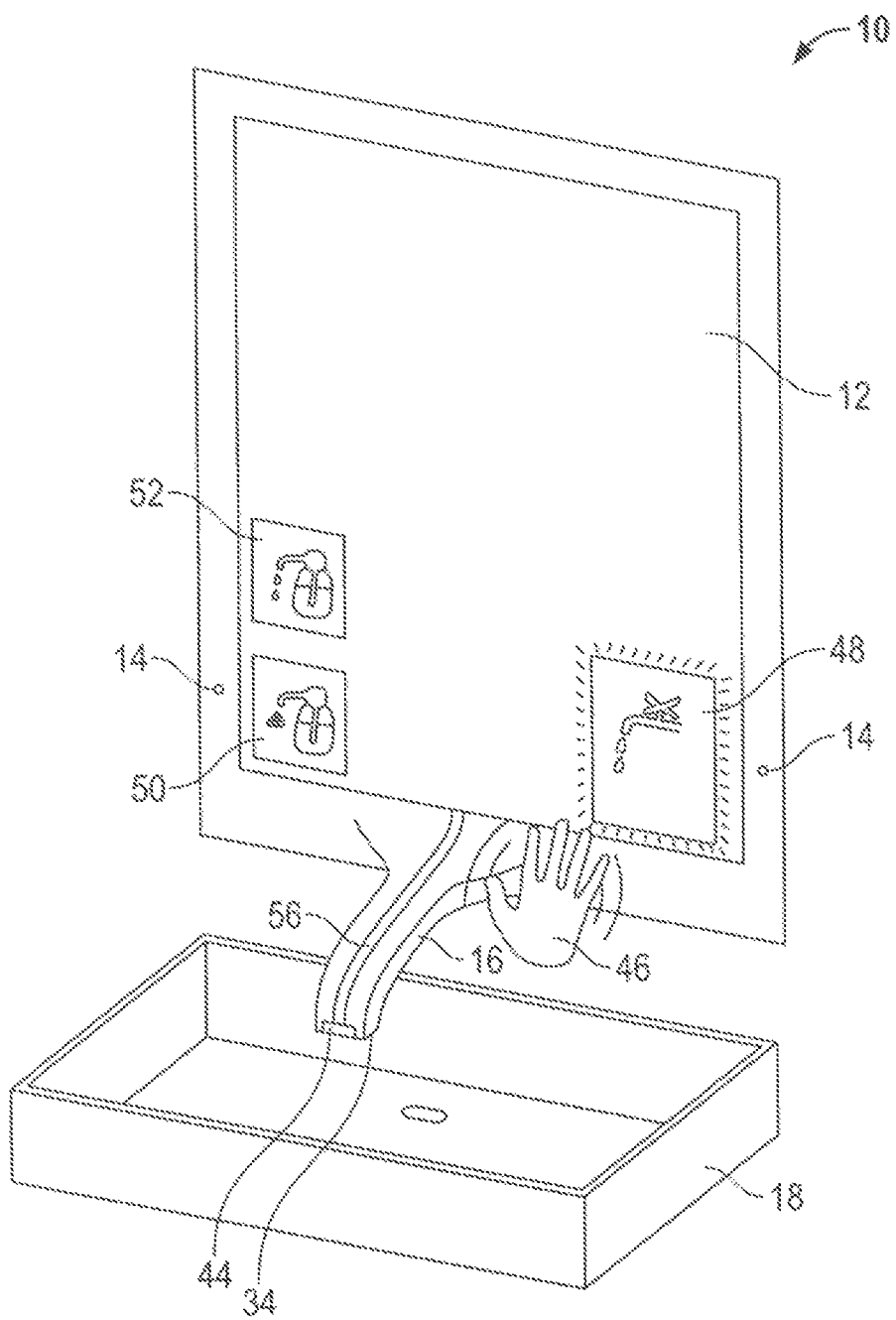
FIG. 4 shows a perspective view of the fluid dispensing device of FIG. 1, illustrating the hand gesture used to direct the device to dispense water.

Following the visual cues, the user then moves his hand 46 toward an icon 48, 50, 52 representing a fluid that is desired to be dispensed. In FIG. 4, the user's hand 46 is shown moving toward the water icon 48. The cameras 14 track the user's movement, and relay this information to the computer. When the computer 42 determines that the user's hand 46 is approaching the water icon 48, based on the images captured by the cameras 14, the computer 42 causes the water icon 48 to flash or grow brighter, indicating that it has been selected.

Figure 5:
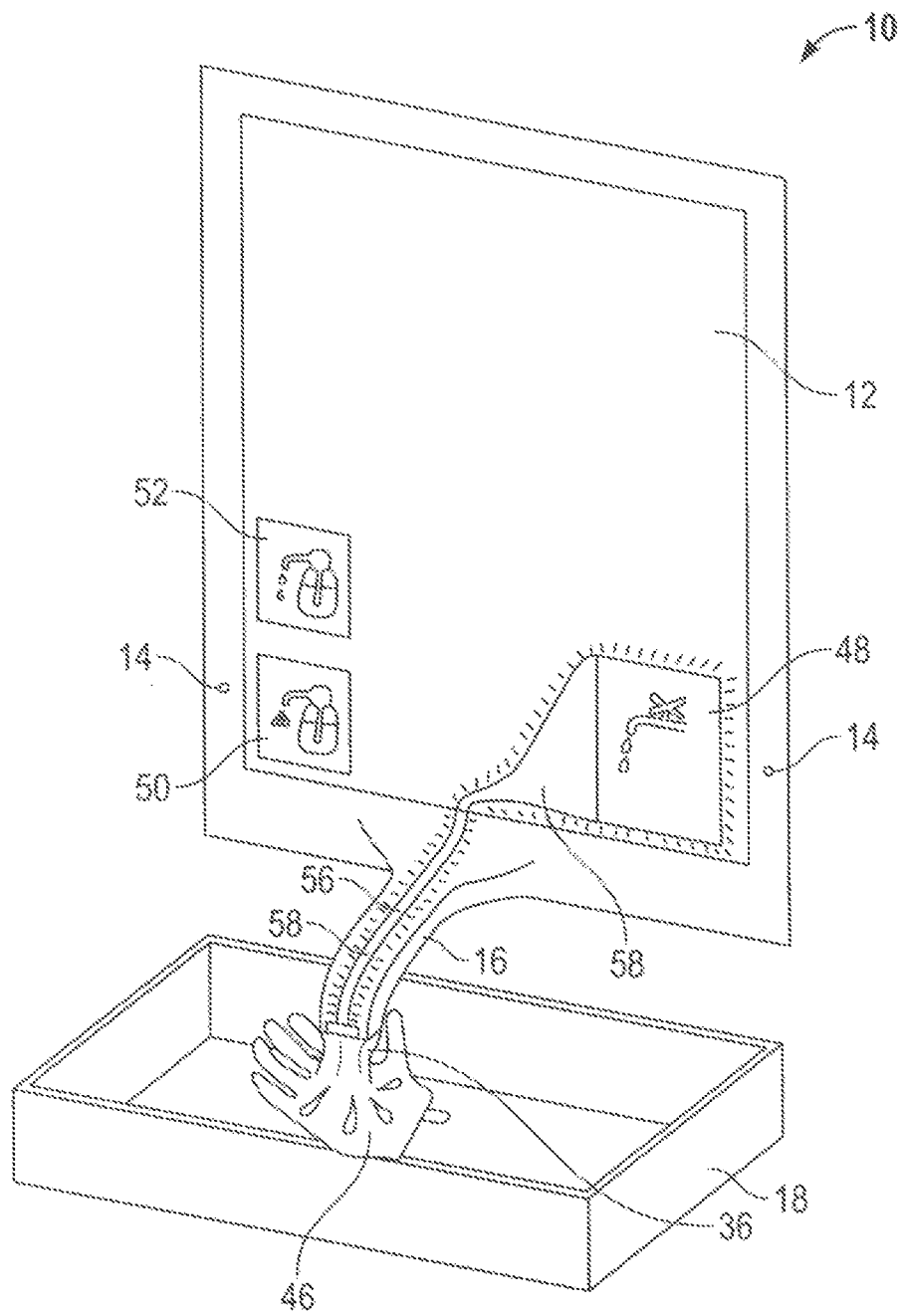
FIG. 5 shows a perspective view of the fluid dispensing device of FIG. 1 dispensing water onto a user's hand.

To assist the user in determining where the water 36 will now be dispensed from, a path of light 58 is displayed on the mirror 12 running from the selected water icon 48 to the bottom edge of the mirror 12, as is shown in FIG. 5. The light guide 56 also lights up, so that a continuous light path 58 is formed running from the water icon 48 to the fluid outlet 34. Preferably, the entire light path 58 does not light up simultaneously, but instead lights up gradually beginning near the water icon 48 and extending downwards toward the fluid outlet 34. This simulates water 36 flowing from the water icon 48 to the fluid outlet 34, and provides a visual cue prompting the user to place his hand 46 below the fluid outlet 34. In some embodiments of the invention, the mirror 12 may also display a video showing where the user's hand 46 should be placed.

The proximity sensor 44 detects when the user's hand 46 is placed below the fluid outlet 34, and relays this information to the computer 42. The computer 42 then causes the electronically operated valve mechanism 40 to open, causing the water 36 to flow through the spout body 16 and onto the user's hand 46, as shown in FIG. 5. When the user's hand 46 is moved away from the fluid outlet 34, the proximity sensor 44 again relays this information to the computer 42, which stops the flow of water 36 by closing the electronically operated valve mechanism 40.

Figure 6:
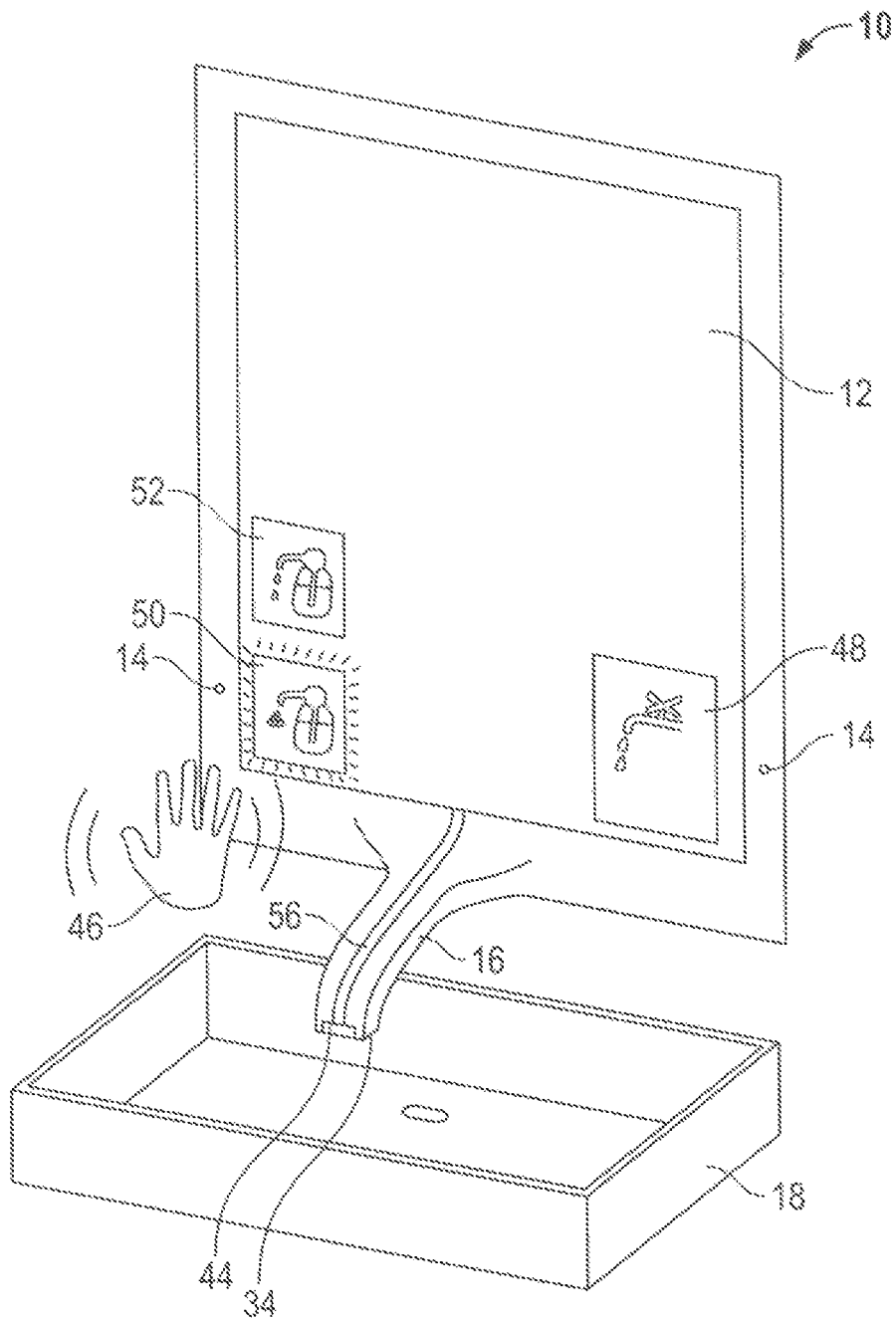
FIG. 6 shows a perspective view of the fluid dispensing device of FIG. 1, illustrating the hand gesture used to direct the device to dispense soap.

The user may then select a different fluid to be dispensed. For example, the user may select soap 24 by moving his hand 46 toward the soap icon 50, as shown in FIG. 6. In some embodiments of the invention, the mirror 12 may prompt the user to dispense soap 24 after water 36 has been dispensed, by flashing the soap icon 50 or by moving the animated hand icon 54 toward the soap icon 50.

Figure 7:
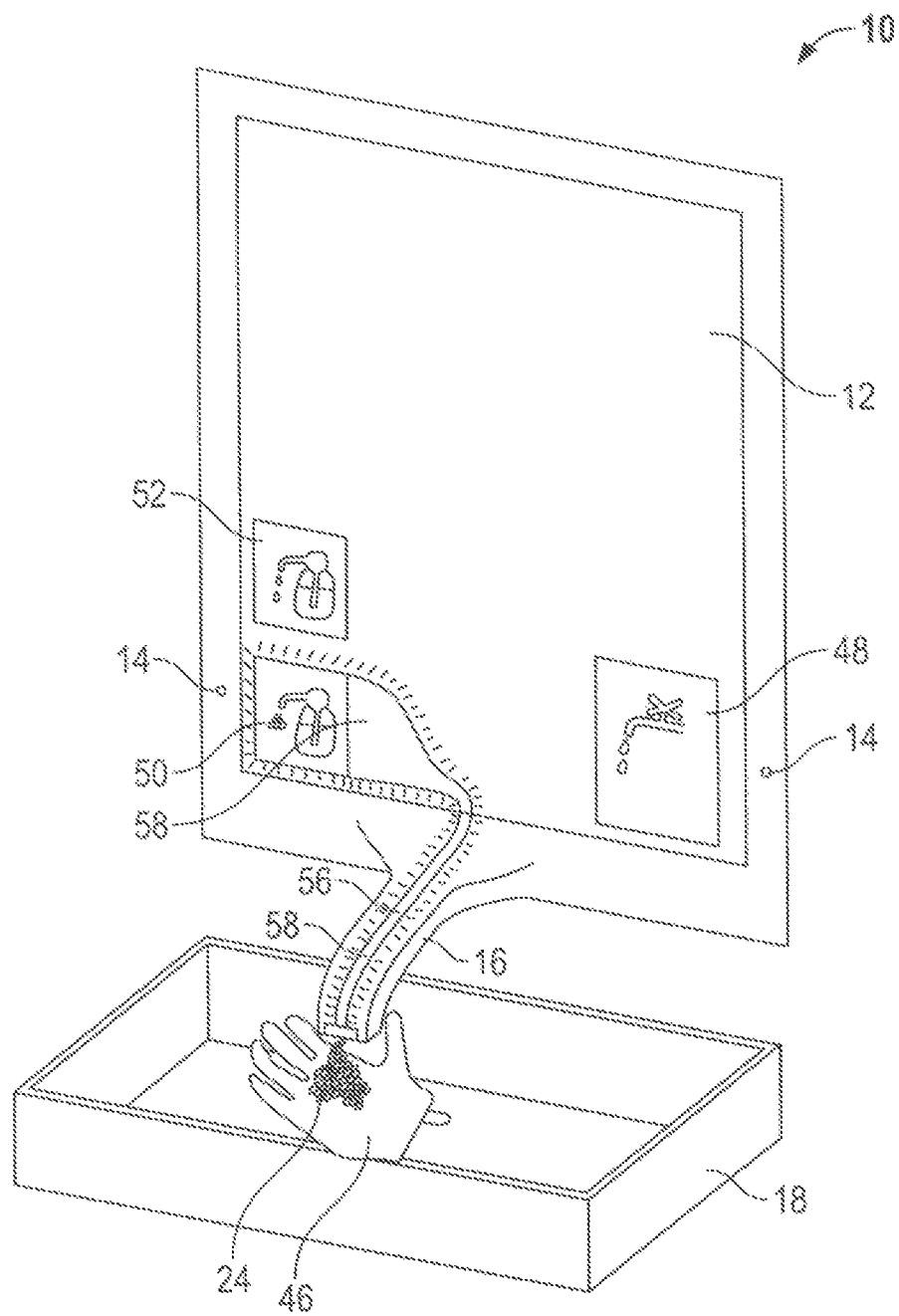
FIG. 7 shows a perspective view of the fluid dispensing device of FIG. 1 dispensing soap onto a user's hand.
Figure 8:
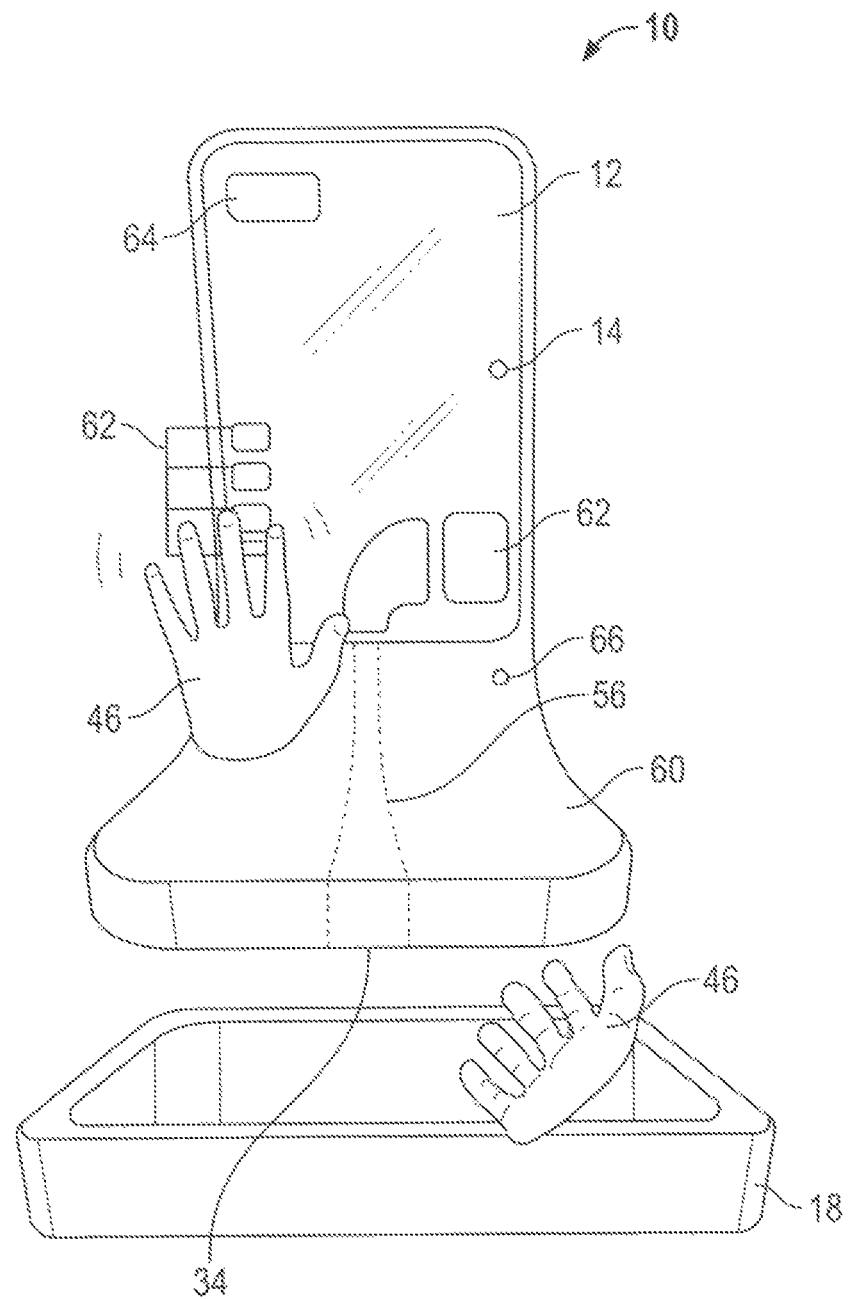
FIG. 8 shows a front view of a fluid dispensing device in accordance with a second preferred embodiment of the invention.
Figure 9:
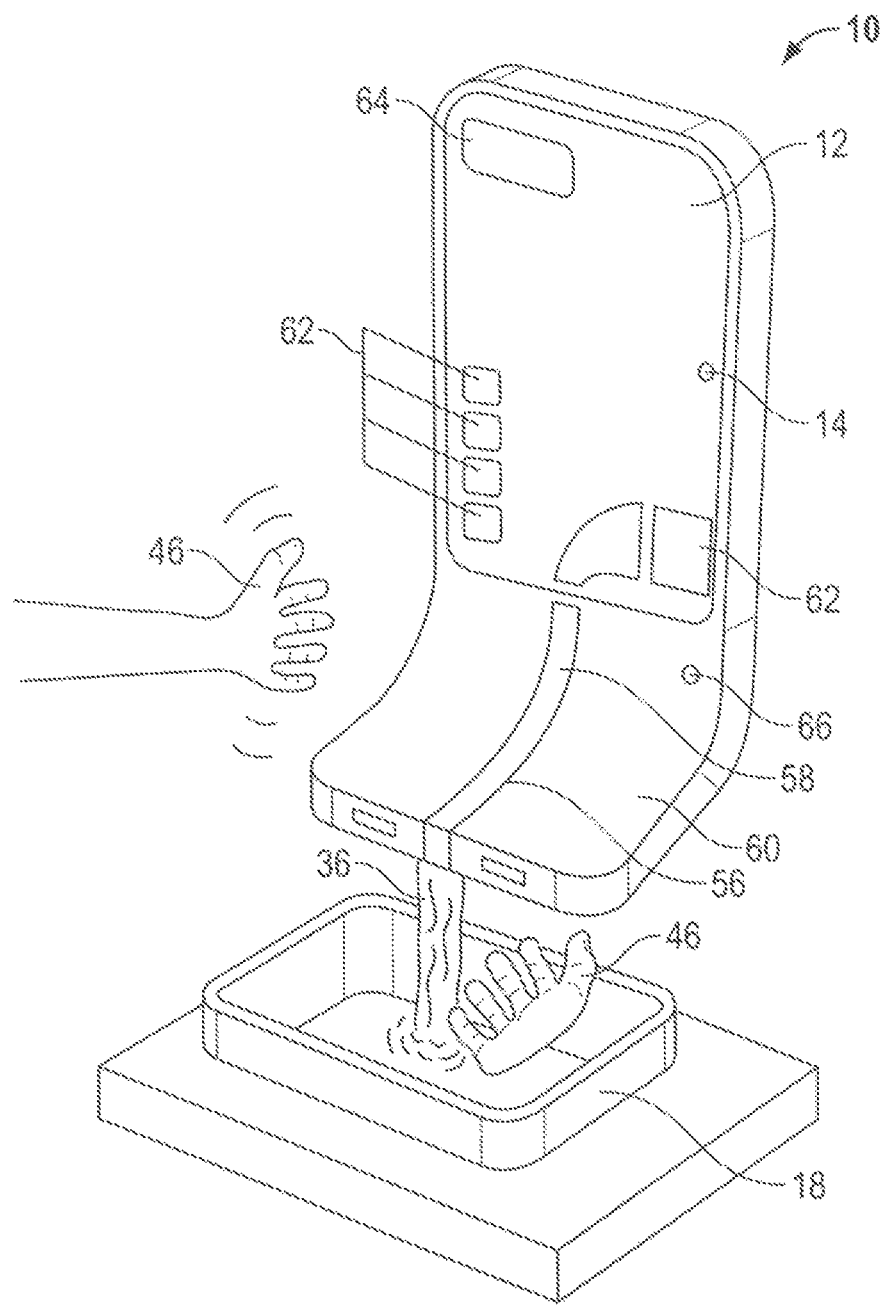
FIG. 9 shows a perspective view of the fluid dispensing device of FIG. 8 dispensing water.
Figure 10:
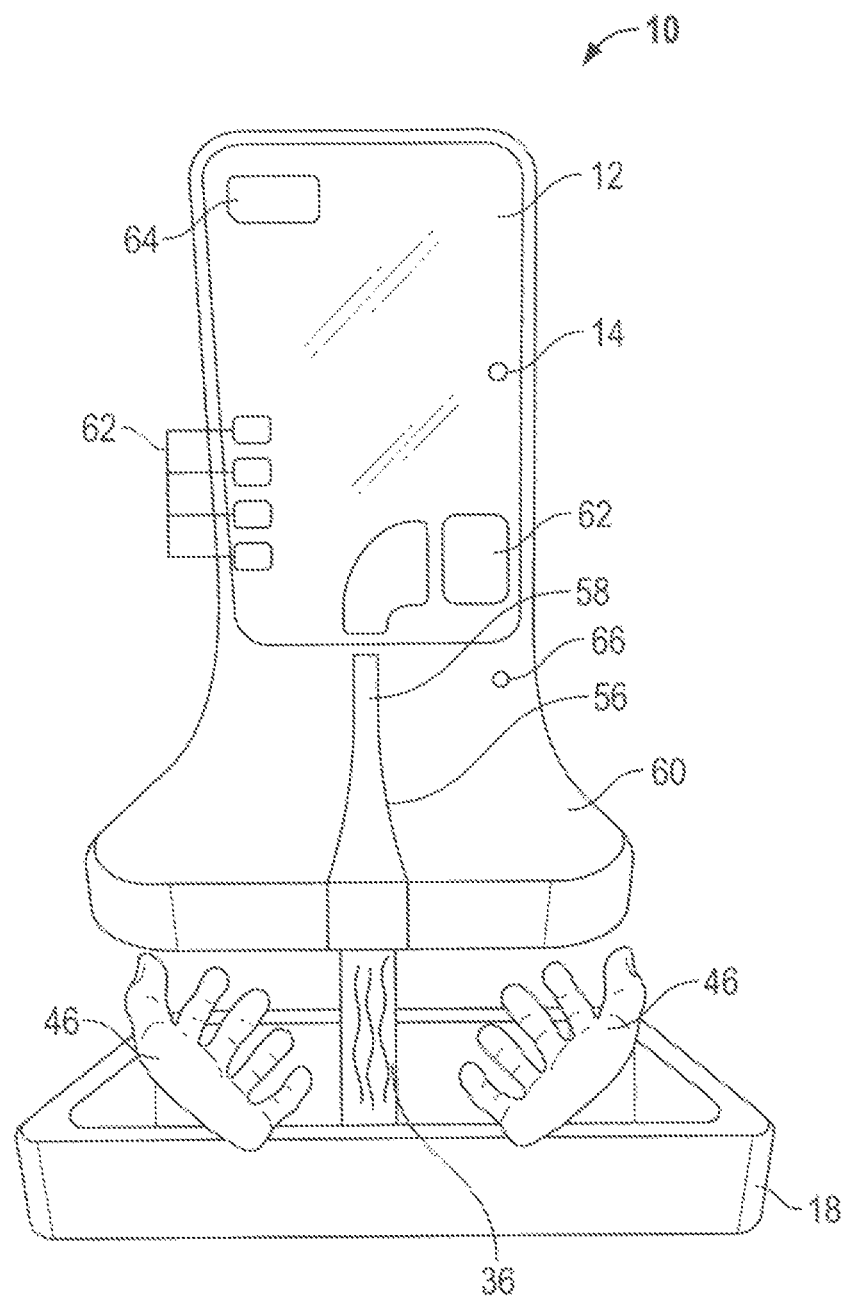
FIG. 10 shows a front view of the fluid dispensing device of FIG. 8 dispensing water.
Figure 11:
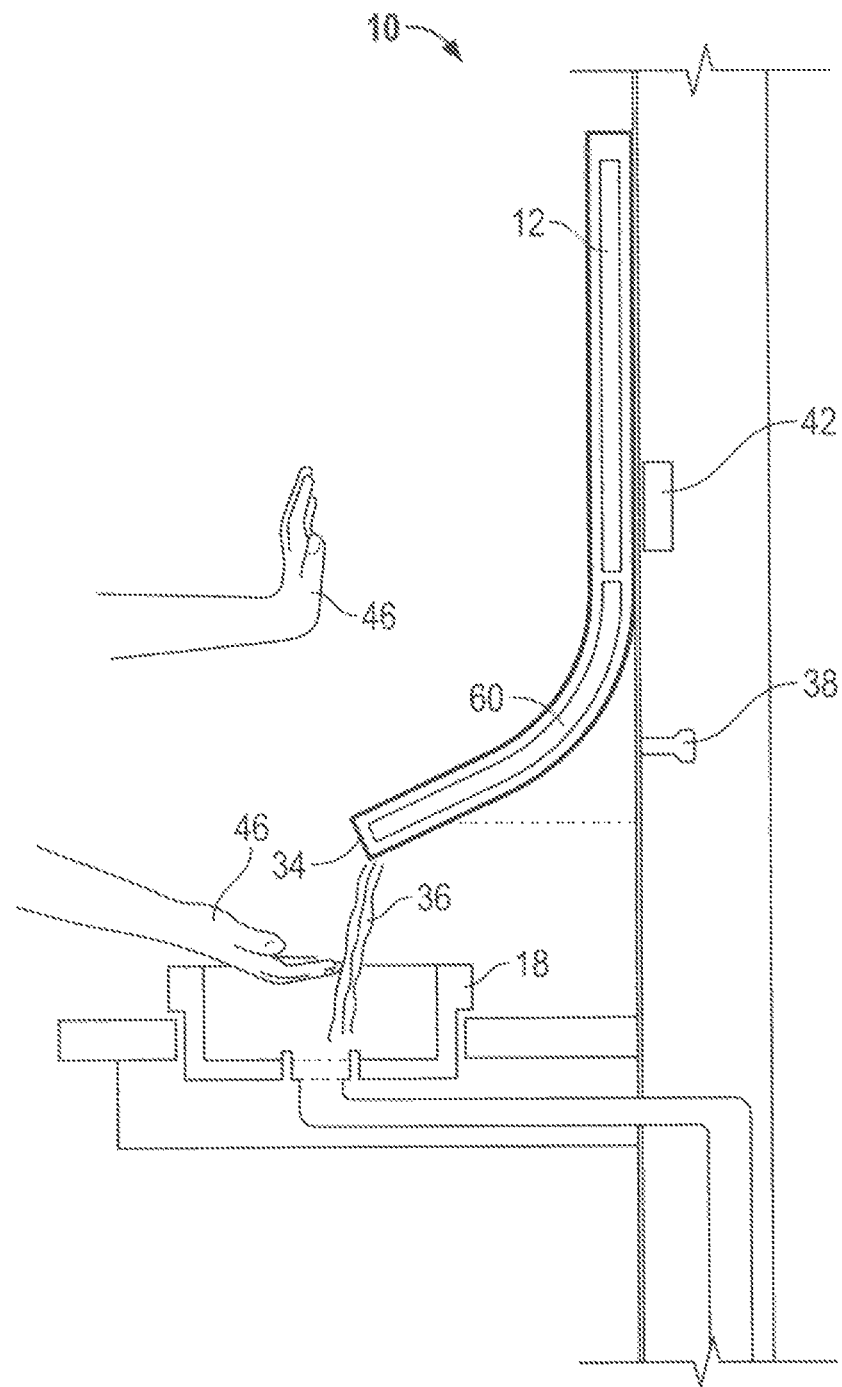
FIG. 11 shows a schematic cross-sectional view of the fluid dispensing device of FIG. 8.

Once the user selects the soap icon 50, the computer 42 causes the mirror 12 and light guide 56 to create a light path 58 between the soap icon 50 and the fluid outlet 34, as shown in FIG. 7. This draws the user's attention from the selected soap icon 50 to the fluid outlet 34, and prompts the user to place his hand 46 below the fluid outlet 34. When the user's hand 46 is placed below the fluid outlet 34, the proximity sensor 44 relays this information to the computer 42. The computer 42 then activates the electrically powered discharge mechanism of the soap dispenser 20, which discharges an allotment of soap 24 through the soap discharge line 26, out the soap outlet 28 and onto the user's hand 46.

To rinse his hand 46, the user can dispense more water 36 by following the procedure as described above. The user can also select hand sanitizer to be dispensed by moving his hand 46 toward the hand sanitizer icon 52, in much the same way as for water 36 and soap 24. In some instances the device 10 may prompt a user to select the hand sanitizer icon 52, for example after the user has washed his hand 46 with water 36 and soap 24. This may be done by flashing the hand sanitizer icon 52 or through other visual and/or audible cues.

Optionally, the light path 58 is color coded based on the fluid that has been selected, and may for example use blue light for water 36, white light for soap 24, and green light for hand sanitizer.

A fluid dispensing device 10 in accordance with a second preferred embodiment of the invention is shown in FIGS. 8 to 11, wherein like numerals are used to represent like components. The device 10 is generally similar to that shown in FIGS. 1 to 7, but with a modified design. In particular, the device 10 is shaped like a curved tablet, with an outwardly projecting dispensing portion 60 that extends over the sink 18. The dispensing portion 60 has a similar function to the spout body 16 of the previous embodiment, and provides a conduit for carrying fluids to a fluid outlet 34 positioned over the sink 18. Like the spout body 16 of the previously described embodiment, the dispensing portion 60 has a light guide 56 which is configured to provide a path of light 58 from the mirror 12 to the fluid outlet 34 when a fluid is selected for dispensing.

The mirror 12 is generally similar to that described in the previous embodiment, and is configured to display a number of icons 62 representing different fluids that can be dispensed and other graphics 64 and information. In addition to a camera 14, the device 10 also incorporates a motion sensor 66 to assist in detecting hand 46 motion during touchless operation of the device 10.

The device 10 is operated using the same general principles as described above. In particular, icons 62 representing different fluids such as water 36, soap 24, and hand sanitizer are selected by a user by moving his hand 46 toward the corresponding icon 62. The camera 14 and motion sensor 66 detect the hand 46 motion and position, and relay this information to the computer 42. The computer 42 then causes the mirror 12 and light guide 56 to illuminate a path of light 58 from the selected icon 62 to the fluid outlet 34. The selected fluid is then dispensed from the fluid outlet 34.

Unlike the previously described embodiment, wherein the spout body 16 has a similar shape to a traditional faucet, the embodiment of the invention shown in FIGS. 8 to 11 does not closely resemble any traditional or well-known hand cleaning equipment. As such, the path of light 58 created by the light guide 56 and mirror 12 may be particularly advantageous for aiding a user in the operation of this embodiment of the invention, as well as for other embodiments having unusual or non-traditional designs.

Optionally, the dispensing portion 60 of the device 10 may incorporate several different fluid outlets 34, including for example a separate outlet 34 for each fluid that can be dispensed by the device 10. This may be advantageous where the fluids require outlets 34 having different sizes and shapes, and for preventing unwanted mixing of the fluids. When multiple fluid outlets 34 are used, the dispensing portion 60 can incorporate multiple light guides 56 so as to be able to provide a path of light 58 to each of the outlets 34 when the corresponding fluid is selected for dispensing. The use of light guides 56 may be particularly advantageous in embodiments of the invention having multiple fluid outlets 34, by allowing users to easily determine which of several outlets 34 the selected fluid will be dispensed from.

It will be understood that, although various features of the invention have been described with respect to one or another of the embodiments of the invention, the various features and embodiments of the invention may be combined or used in conjunction with other features and embodiments of the invention as described and illustrated herein.

It is to be appreciated that the term "fluid" as used herein is intended to refer broadly to liquids, gels, creams, foams, and other flowable substances. The device of the present invention is not limited to dispensing water 36, soap 24, and hand sanitizer, but could be configured to dispense any other fluids as may be desired, such as toothpaste, moisturizer, mouth wash, or shaving foam. The device need not dispense water 36, soap 24, or hand sanitizer, but could dispense other fluids instead.

The mirror 12 could be configured to display any desired graphics, images, videos, or information, and is not limited to the specific images and graphics as have been described above. For example, the mirror 12 could display other information such as weather, news headlines, e-mail, advertisements and the like. The device 10 could also incorporate selectable icons that cause a predetermined sequence of fluids to be dispensed. For example, the mirror 12 could be configured to display an icon that, when selected, causes the device 10 to dispense water 36 for several seconds, allowing the user to wet his hands 46, and then discharges an allotment of soap 24. The user could then be given a predetermined amount of time to scrub his hands 46 before water 36 is again dispensed for rinsing. The mirror 12 may furthermore be configured to display a timer to assist in proper hand washing duration.

The mirror 12 may incorporate a selectable icon which permits the temperature of dispensed water 36 to be controlled. For example, selecting a temperature control icon (which could be depicted as a thermometer) could cause the mirror 12 to display a graphic depicting a range of temperatures. By moving his hand 46 toward the desired temperature, the user could set the temperature of the water 36 that is dispensed.

The device 10 may also be programmable so that a user can set up personalized options. For example, each user in a household may have their own selectable icon wherein parameters such as sequence, timing, and temperature of dispensed fluids are set based on the user's preferences. The device 10 may be programmable directly using the touchless interface, or may be programmable remotely using other devices such as a personal computer or smart phone. The device 10 may be connected to the internet and other devices by wired or wireless connection, including for example through Ethernet cables, USB connectors, Wi-Fi and Bluetooth. In some embodiments, the device 10 may be capable of running and/or interacting with mobile applications and the like.

In some embodiments of the invention, the mirror 12 displays an information icon, which when selected causes the mirror to display information about the device 10. For example, the mirror 12 may be configured to display information about the soap 24 and hand sanitizer that is dispensed by the device 10, such as their brand name and chemical composition. The device 10 may also be configured to display the volume of soap 24 and hand sanitizer that is present in the respective reservoirs, which could be used for example by custodial staff to determine whether the reservoirs need to be refilled. The device 10 may also display the amount of soap 24 and hand sanitizer that is dispensed with each activation of the respective discharge mechanisms, and may allow a user to adjust these amounts. The device 10 may also display the water 36 flow speed, and allow the user to adjust this speed.

It is to be appreciated that the device 10 need not include a proximity sensor 44, and could instead simply dispense the selected fluid after the appropriate icon has been selected. The device 10 could also use a single camera 14, or could incorporate more than two cameras 14.

It is to be appreciated that the fluid dispensing device 10 need not have the particular construction and appearance as has been shown in the exemplary embodiments. Rather, any alternate construction that allows fluid to be touchlessly dispensed and which provides appropriate visual cues, such as selectable icons 62 and a light path 58, could be used instead.

It is to be understood that the device 10 need not use the particular Graphical User Interface that has been depicted and described. Rather, any suitable GUI that permits a user to select the desired fluids to be dispensed could be used instead.

In addition to the components that have been specifically described above, the device 10 could also incorporate additional components such as vanity lights, speakers, microphones, and the like to provide further enhanced functionality. In some embodiments of the invention, the device 10 is capable of accepting voice commands in one or more languages. In some embodiments of the invention the device 10 is capable of facial recognition, and can adjust its settings based on the preferences of a recognized user. The device 10 may also be capable of estimating the size of a user's hands 46 based on the images captured by the camera 14, and adjust the amount of soap 24 or hand sanitizer that is dispensed accordingly. In some embodiments, the device 10 may recognize improper hand washing techniques, and provide suggestions for improving technique through videos, animation, or the like. In some embodiments of the invention, the computer 42 may be configured to recognize different hand gestures, such as waving, thumbs up, and pointing, and perform different functions based on the gesture that is detected.

The light guide 56 could have any desired form, and could be made from any appropriate materials that can illuminate to provide a light path 58. For example, the light guide 56 could be formed as a continuous, flat LED light. Alternatively, the light guide 56 could be in the form of a tube, or any other desired three-dimensional shape. The light guide 56 could also be formed by a series of spaced LED lights rather than one continuous light. In some embodiments of the invention, the light guide 56 is formed by a flexible OLED display which shows animated graphics. Such a light guide 56 may, for example, display an animated steam of flowing water as a light path 58. In some embodiments, the light path 58 is provided by the light guide 56 only, and not by the mirror 12. In other embodiments, the mirror 12 and light guide 56 are integrated as one continuous display.

While the fluid dispensing device 10 has been described as being installed in a bathroom, it is to be appreciated that the device 10 could be installed in any desired location.

Figure 12:
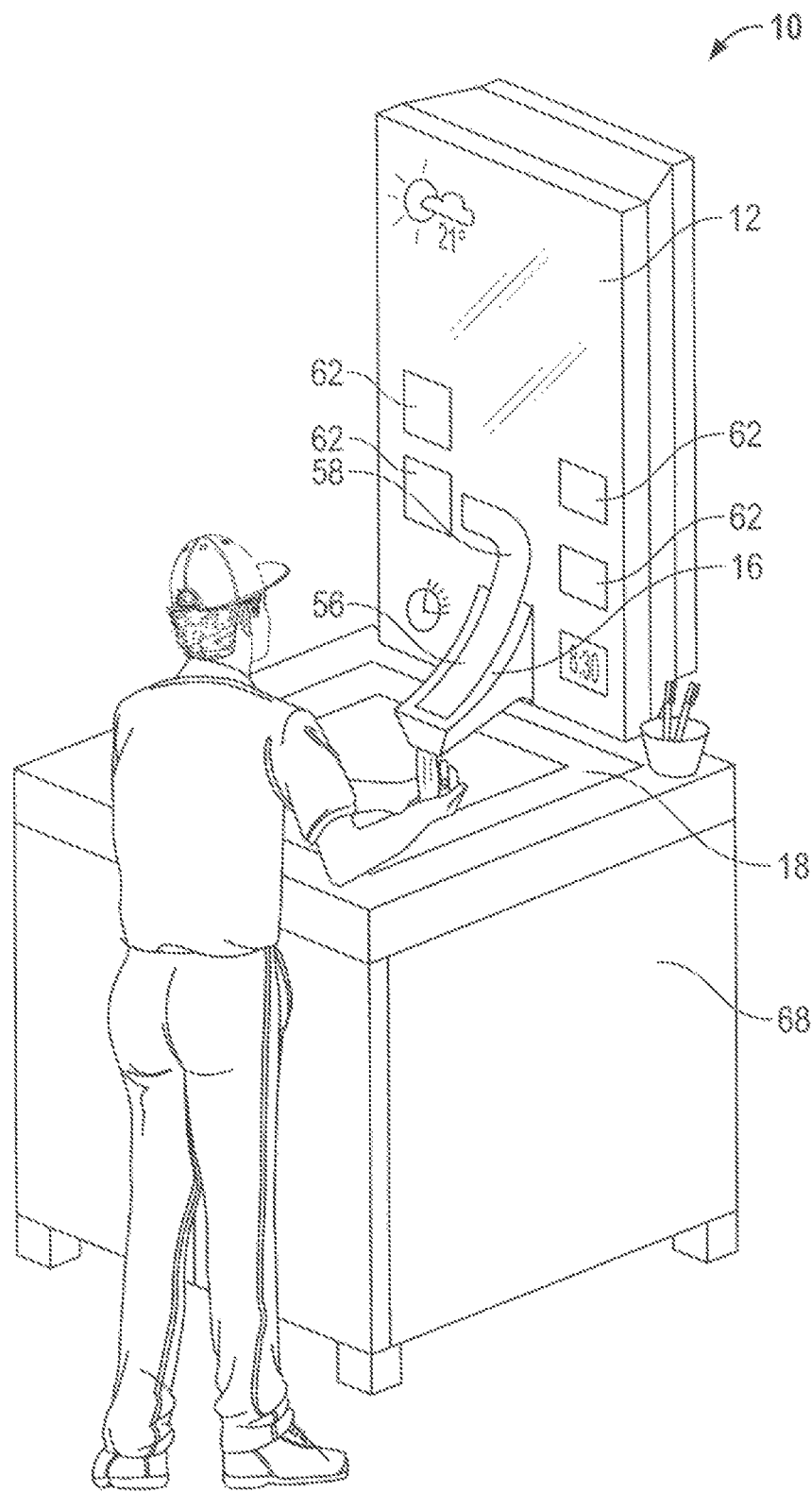
FIG. 12 shows a perspective view of a fluid dispensing device in accordance with a third preferred embodiment of the invention.

A fluid dispensing device 10 in accordance with a third preferred embodiment of the invention is shown in FIG. 12, wherein like numerals are used to represent like components. The device 10 is generally similar to that shown in FIGS. 1 to 7, but with a modified design. In particular, the electronic mirror 12 is shaped to wrap around the sides of the outwardly projecting spout body 16. This allows the electronic mirror 12 to sit closer to the sink 18 and, thus, is more accessible for users with a below-average height, such as children.

The electronic mirror 12 displays a number of icons 62, which are used to select fluids to be dispensed, as in the previously described embodiments. In addition to water 36, soap 24, and hand sanitizer, the device 10 may dispense various additional gels and liquids, such as shaving foam or moisturizer. The electronic mirror 12 may also display additional information, such as the weather and time.

Optionally, the spout body 16 may be a permanently installed faucet, with the electronic mirror 12 detachably mounted thereto. The electronic mirror 12 may communicate with the spout body 16 via wired or wireless connections. The soap dispenser 20 and hand sanitizer dispenser 22 (not shown) may optionally be located in the cabinet 68 below the sink 18, or behind the electronic mirror 12. The electronic mirror 12 may operate using batteries, or may be wired to an external power source. In some embodiments, the electronic mirror 12 may be powered by overhead light using solar panels.

Figure 13:
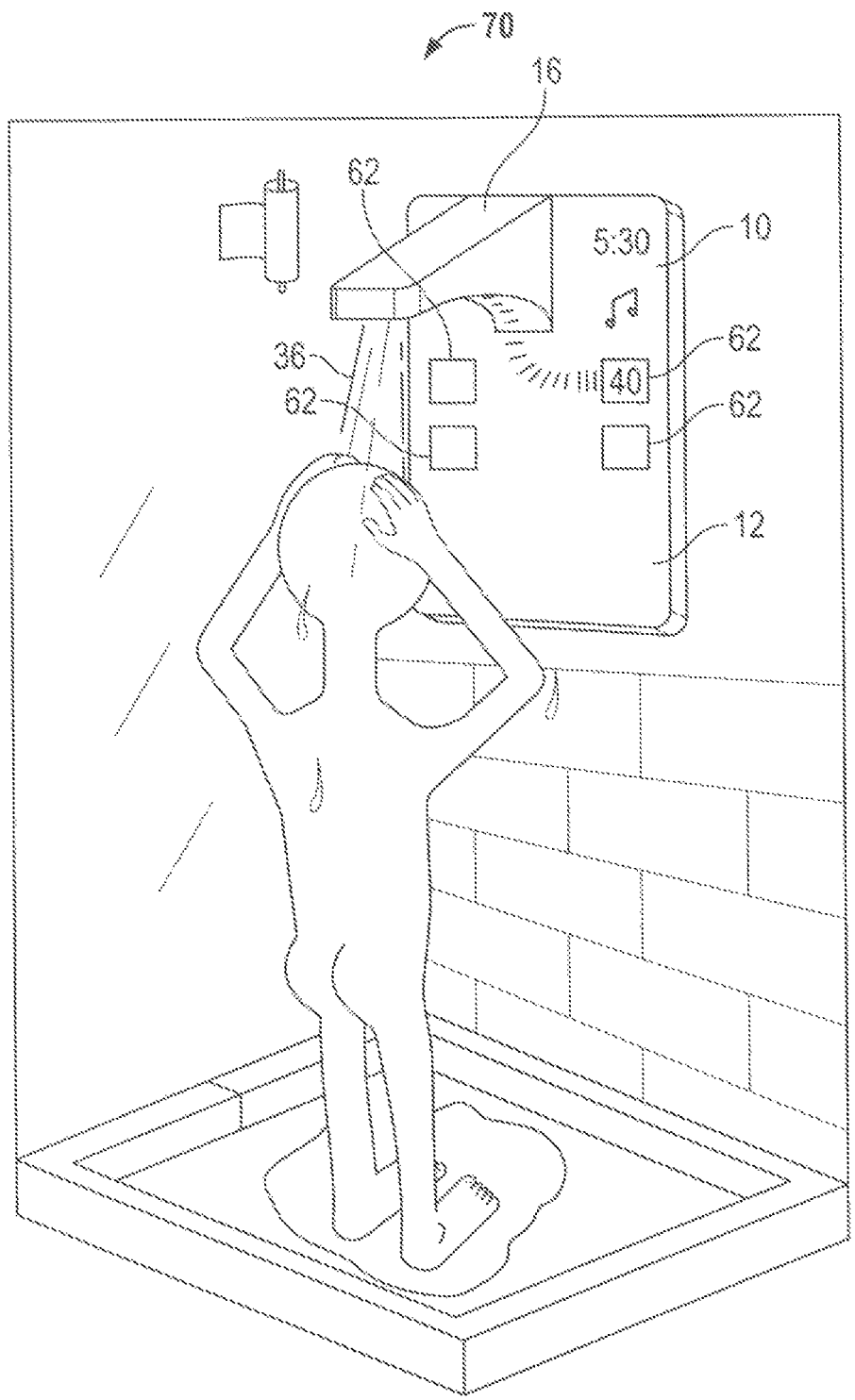
FIG. 13 shows a perspective view of a fluid dispensing device in accordance with a fourth preferred embodiment of the invention.

A fluid dispensing device 10 in accordance with a fourth preferred embodiment of the invention is shown in FIG. 13, wherein like numerals are used to represent like components. The device 10 is generally similar to that shown in FIG. 12, modified for use in a shower 70. In this embodiment of the invention, the spout body 16 is positioned near the top of the electronic mirror 12, and is configured to produce a downward spray of water 36 onto a user standing in the shower 70.

The device 10 has a water-tight construction, to prevent splashed water 36 and steam from short circuiting the device 10. For improved safety, the device 10 preferably operates at a low voltage.

In addition to water 36, the device 10 may dispense other fluids such as shampoo, body wash, and conditioner. Icons 62 may be used to select the fluid to be dispensed, as well as for selecting water 36 temperature and pressure. The device 10 may also be configured to play music or radio.

The electronic mirror 12, as shown in FIG. 13, can be provided to be detachably mounted about the faucet body 16, and may be used in an inverted condition so as to serve as an electronic mirror about a complementarily sized faucet body 16 in FIG. 12, with suitable adjustment of the location of the icons 62 on its electronic mirror.

A fluid dispensing device 10 in accordance with a fifth preferred embodiment of the invention is shown in FIGS. 14 to 17, wherein like numerals are used to represent like components. The device 10 is generally similar to that shown in FIGS. 1 to 7.

The device 10 includes an electronic display 72, two sensors 74, and an outwardly projecting spout body 16 for dispensing fluid. The device 10 is wall-mounted over a sink 18. As in the previously described embodiments, the device 10 has a computer 42, and is connected to a soap dispenser 20, a hand sanitizer dispenser 22, and a water pipe 36, which may, for example, be mounted at the back of the electronic display 72 similarly to the arrangement shown in FIG. 2. The computer 42 controls the electronic display 72, as well as the dispensing of fluids such as water 36 and soap 24 from the spout body 16, as in the previously described embodiments.

The electronic display 72 is configured to display graphics, such as water icon 48, soap icon 50, and hand sanitizer icon 52. As in the previously described embodiments, the icons 48, 50 and 52 are selected by moving the user's hand 46 towards one of the icons 48, 50 and 52. The location of the user's hand 46 is detected by sensors 74, which transmit detection data to the computer 42 for interpretation. The sensors 74 may use infrared, radar, time of flight, or any other suitable detection method for detecting the location of the user's hand 46.

Figure 18:
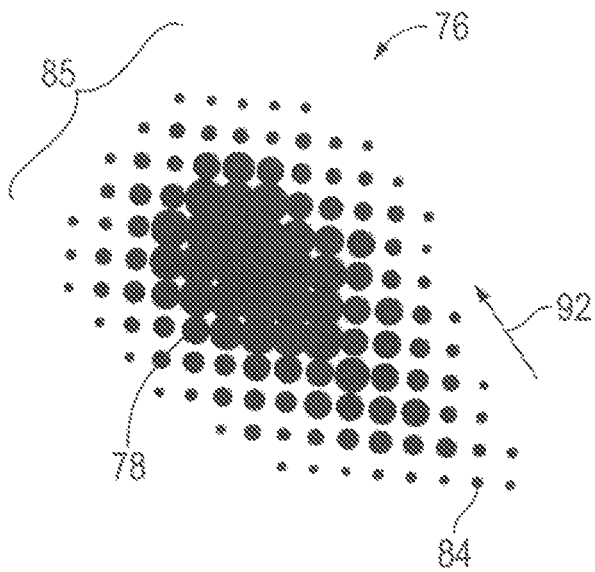
FIG. 18 shows a detailed view of the movable indicator of FIG. 15.
Figure 19:
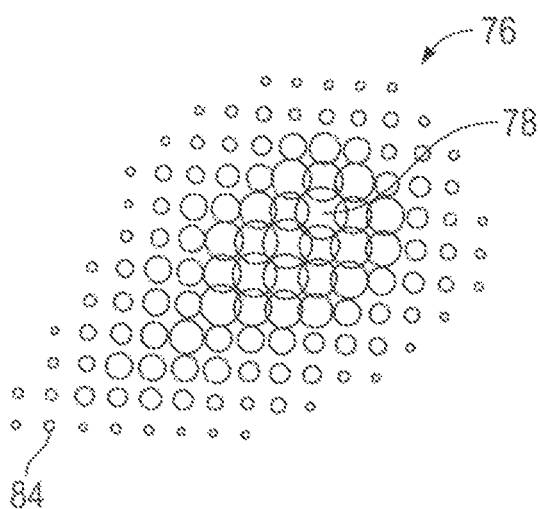
FIG. 19 shows a detailed view of the movable indicator of FIG. 16.

To provide further enhanced touchless control, the computer 42 is configured to display a movable indicator 76 on the electronic display 72. The movable indicator 76 is best shown in FIG. 18 as an array of dots having a cloud-like appearance, with the dots near the center 78 of the indicator 76 being larger in size than the dots at the periphery of the indicator 76. The computer 42 is configured to display the movable indicator 76 at a location on the electronic display 72 that tracks the location of the user's hand 46, so that the movable indicator 76 may be used to select and interact with the graphics displayed on the electronic display 72. For example, when the user's hand 46 is moved upwardly, downwardly, or sideways, the movable indicator 76 moves in a corresponding direction on the electronic display 76.

The movable indicator 76 is used to provide immediate visual feedback to the user, allowing for intuitive touchless control of the device 10 while also discouraging the user from touching the electronic display 72. The computer 42 is configured to only display the movable indicator 76 when the user's hand 46 is determined to be within a preselected zone 80 in front of the electronic display 72. The preselected zone 80 may, for example, be defined by the detection range of sensors 74.

Figure 14:
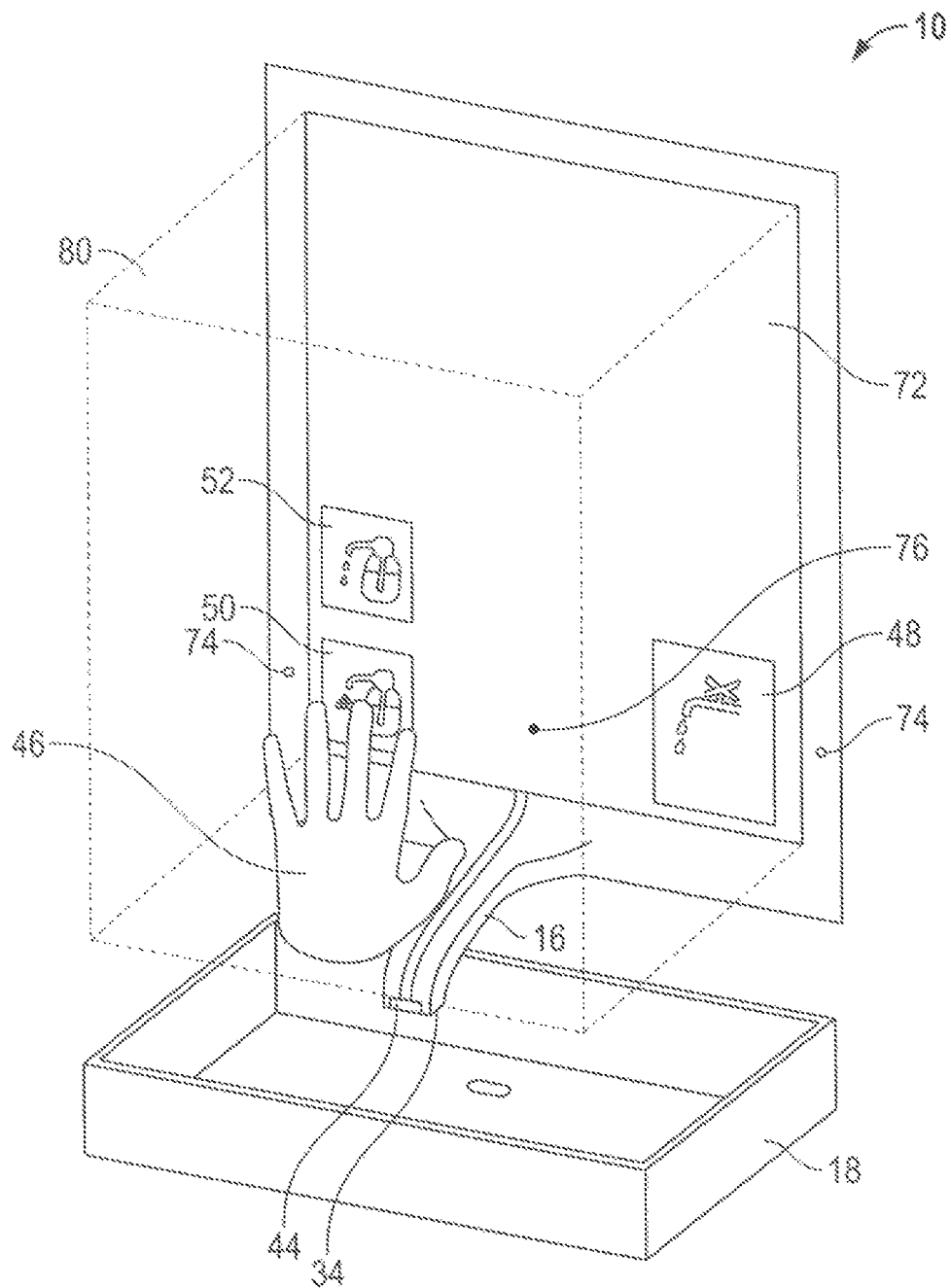
FIG. 14 shows a perspective view of a fluid dispensing device in accordance with a fifth preferred embodiment of the invention, illustrating the appearance of a movable indicator on an electronic display of the device.
Figure 15:
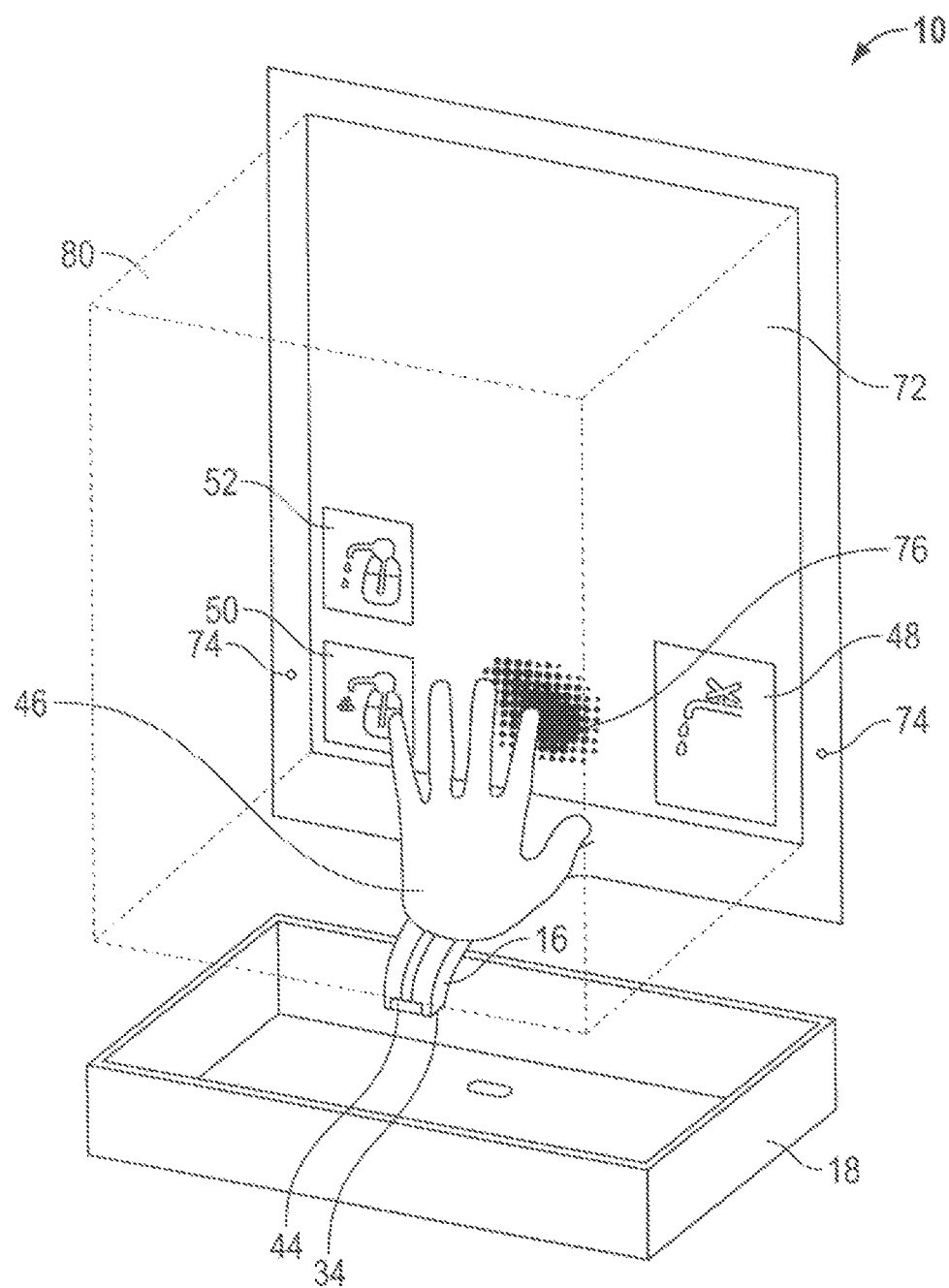
FIG. 15 shows a perspective view of the fluid dispensing device of FIG. 14, illustrating the growth of the movable indicator as the user's hand reaches an optimal distance from the electronic display.

The computer 42 is also configured to modify a visual characteristic of the movable indicator 76 depending on a distance of the user's hand 46 from the electronic display 72. For example, in the embodiment which is shown, the number and size of the dots increases as the user's hand 46 is moved closer to the electronic display 72. When the user's hand 46 first enters the preselected zone 80, the movable indicator 76 comprises a single dot, as shown in FIG. 14. As the user's hand 46 is moved closer to the electronic display 76, the size and number of dots increases to form a cloud-like effect, as shown in FIG. 15.

The appearance of the movable indicator 76, and its growth as the user's hand 46 is moved towards the display 72, provides immediate visual feedback, so that the user intuitively understands that the device 10 has detected and is tracking his or her hand 46. The user is thus discouraged from touching the device 10, as it is immediately obvious that the device 10 can be controlled without physical contact. Preferably, the movable indicator 76 grows to a significant size, so that it is highly visible to the user. Audio feedback may also be used in conjunction with the appearance and growth of the movable indicator 76, to further enhance usability.

Figure 16:
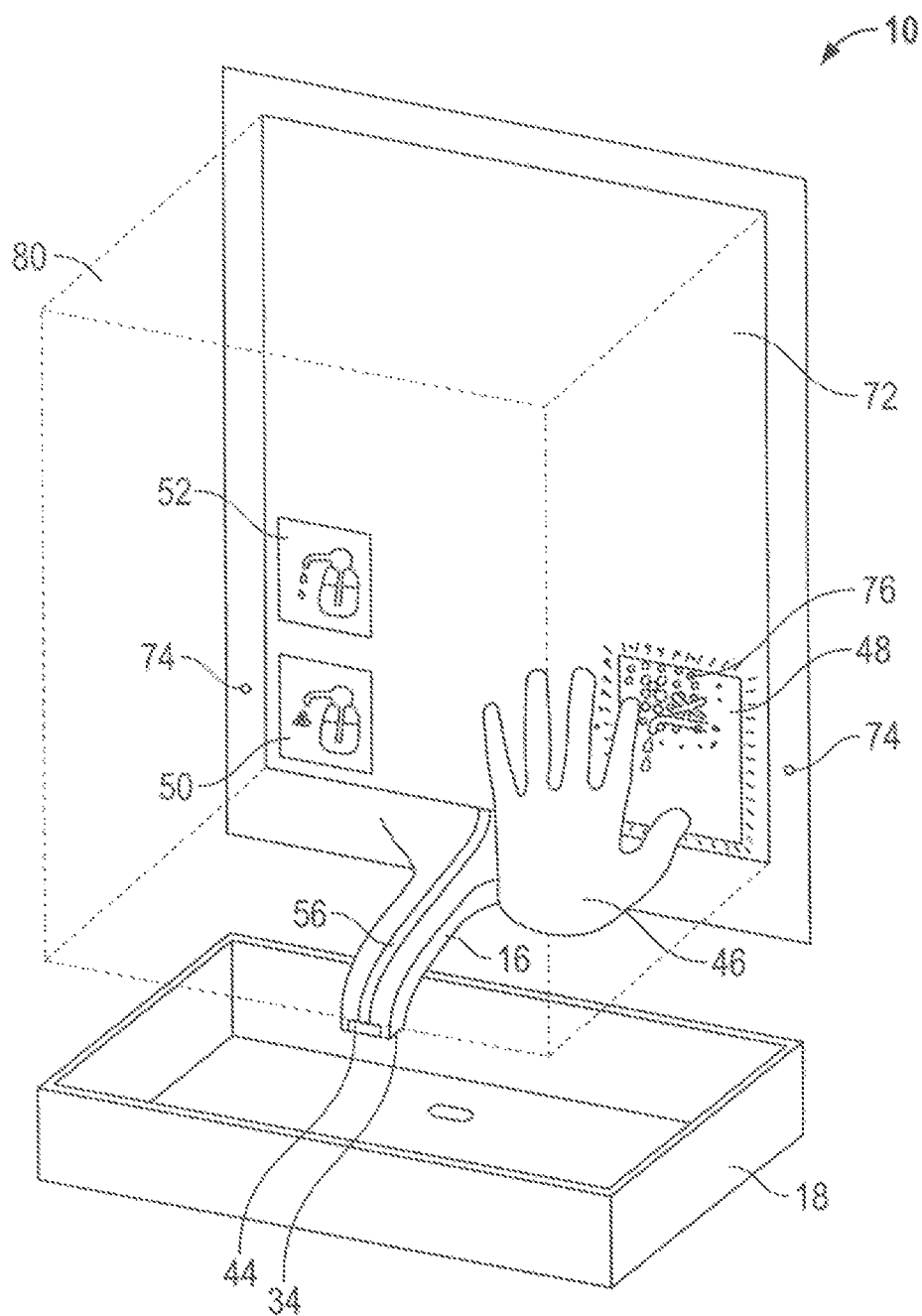
FIG. 16 shows a perspective view of the fluid dispensing device of FIG. 14, illustrating a change in position and visual appearance of the movable indicator as it tracks the user's hand to select a water icon.

To select a fluid to be dispensed, the user's hand 46 is moved to a position in front of one of the icons 48, 50 or 52. This causes the movable indicator 76 to likewise move over the icon 48, 50 or 52 to be selected. FIG. 16 illustrates an example wherein the movable indicator 76 has been moved over the water icon 48, to select water 36 to be dispensed from the device 10. Optionally, the movable indicator 76 may become semi-transparent as it moves over the icon 48, as shown in FIG. 16, so that the icon 48 remains visible through the indicator 76. The icon 48 may then light up, or otherwise change in visual appearance, to indicate that it has been selected. The device 10 then dispenses water from the spout body 16, in the same manner as in the previously described embodiments.

Figure 17:
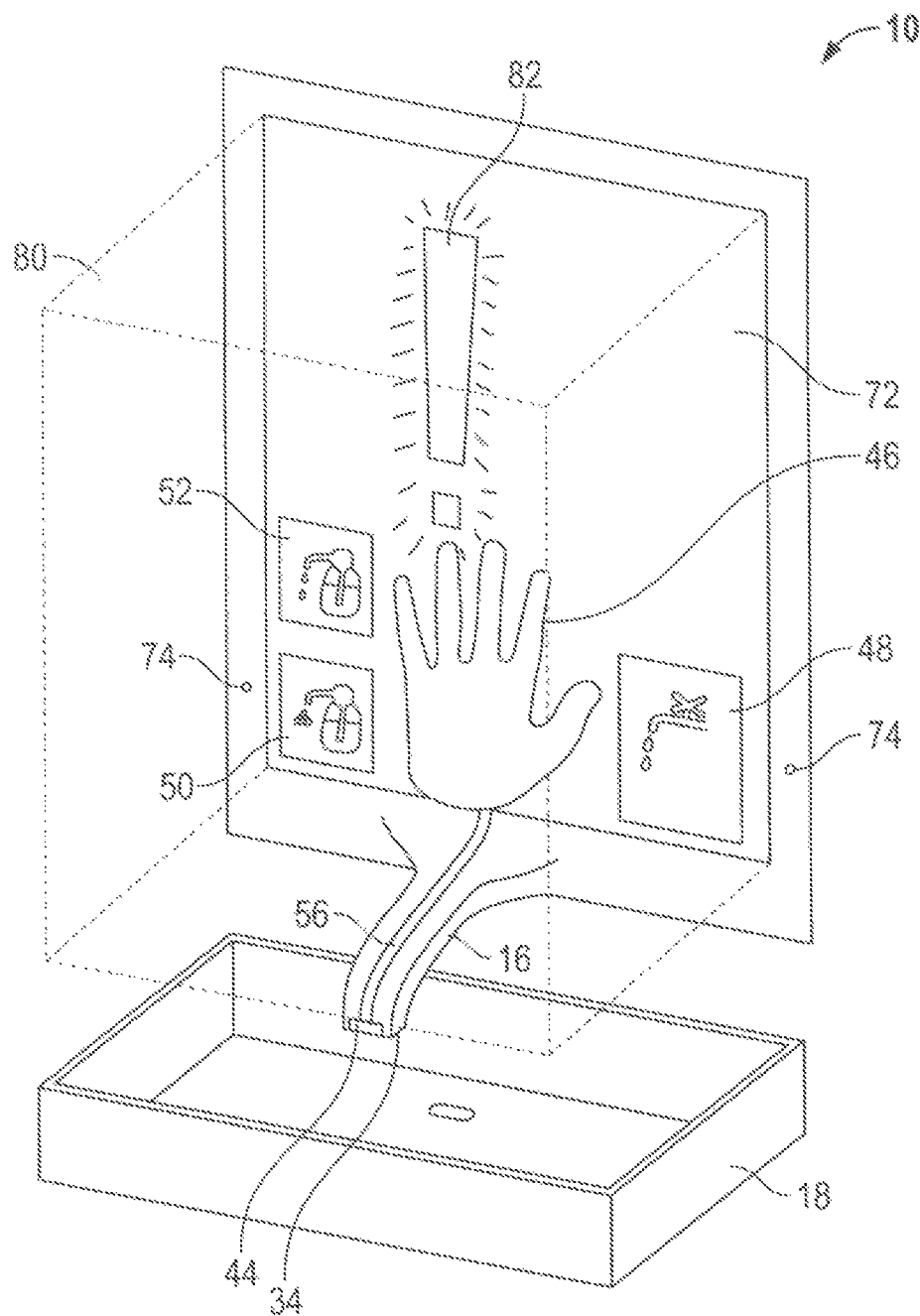
FIG. 17 shows a perspective view of the fluid dispensing device of FIG. 14, illustrating an alert that is displayed when the user's hand is moved too close to the electronic display.

To further discourage the user from touching the electronic display 72, the computer 42 may be configured to reduce the size of the movable indicator 76 when the user's hand 46 moves closer than an optimal distance from the electronic display 72. This would provide feedback to the user that his or her hand 46 should be moved further away from the device 10 for optimal control. As shown in FIG. 17, the computer 42 may furthermore be configured to display an alert 82 when the user's hand 46 is placed within a preselected distance of the electronic display 72, to discourage the user from moving his or hand 46 any closer to the display 72. The alert 82 may include visual and audible warnings intended to communicate to the user that the device 10 should not be touched. Preferably, the device 10 cannot be operated while the alert 82 is displayed, to further discourage users from touching the display 72. The movable indicator 76 may disappear when the alert 82 is displayed, so that it is clear to the user that the device 10 cannot be operated by touching the display 72. Other graphics, such as the icons 48, 50 and 52, may also disappear.

In some embodiments of the invention, the device 10 may be configured to detect when a user touches the device 10. When a touching event is detected, the device 10 may transmit a signal to custodial staff, indicating that the device 10 should be cleaned as soon as possible. In some embodiments of the invention, the device 10 may display an out of order message after a touching event is detected and until the device 10 has been cleaned, to discourage other users from using the device 10 and possibly spreading infectious agents.

The movable indicator 76 may have a tail 84 that indicates the direction of movement 92, as shown in FIG. 18. The tail 84 may be produced by a time delayed shrinking of the dots as the movable indicator 76 is moved, so that the tail 84 provides a trace of that movement. This may assist in intuitively controlling the movable indicator 76, as well as providing a visually interesting feature that may make operation of the device 10 more enjoyable. The tail 84 may have a different visual appearance from the rest of the movable indicator 76, such as a different color, shape, density, or other visual characteristic, and may appear longer when the movable indicator 76 is moved quickly and shorter when the movable indicator 76 is moved slowly.

In some embodiments, the movable indicator 76 may also include a visually distinct leading edge 85 facing the direction of movement (i.e. on the opposite side as the tail 84). The leading edge 85 may, for example, be shown as brighter, darker, or a different shape, density or color from the rest of the indicator 76. This may further assist in the intuitive control of the movable indicator 76, as well as being visually interesting.

It is to be appreciated that the movable indicator 76 need not have the specific form as illustrated in the preferred embodiments. Rather, the movable indicator 76 could have any shape and visual characteristics suitable for controlling the device 10. For example, in place of dots, other graphic elements such as squares, triangles, stars, pictures, or animations could be used. Instead of changing in size, other visual characteristics of the movable indicator 76 could be modified to provide feedback to the user. For example, the color or color density of the indicator 76 could change as the user's hand 46 is moved towards the electronic display 72. The color density could also be higher at the center 78 of the indicator 76 than at the periphery. The movable indicator 76 preferably provides a striking visual contrast to its surroundings, so that it is easily seen.

Figure 20:
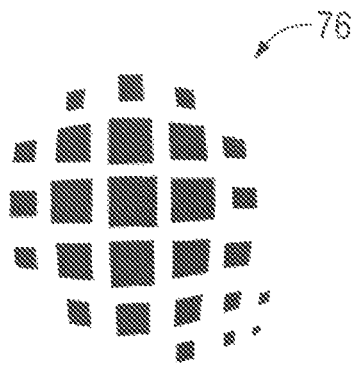
FIG. 20 shows a detailed view of a first alternative movable indicator having a three-dimensional bulging effect, which may be used in place of the movable indicator of FIG. 18.
Figure 21:
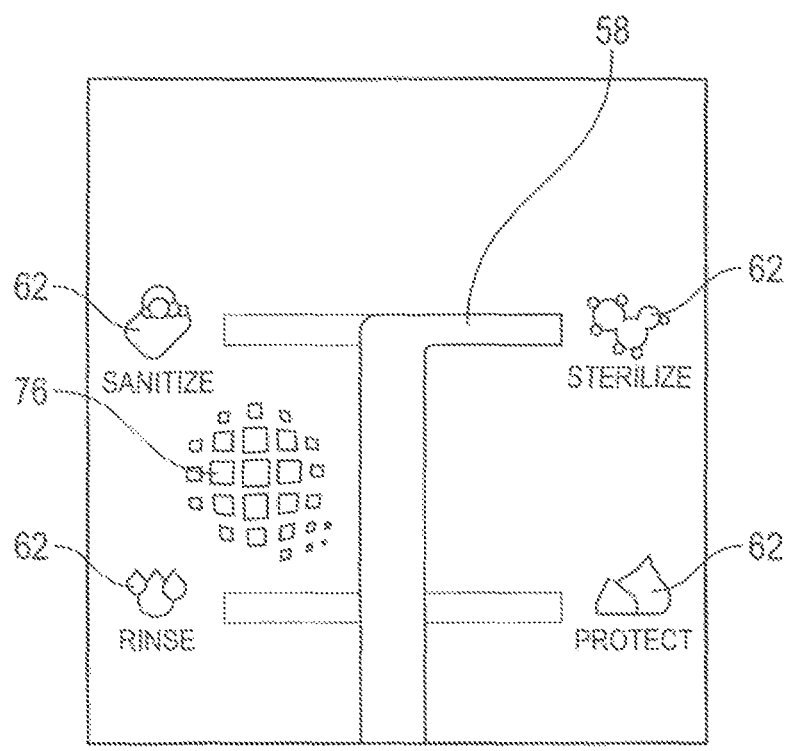
FIG. 21 shows an alternative set of graphics that may be displayed on the electronic display of the fluid dispensing device of FIG. 14, including the first alternative movable indicator as shown in FIG. 20.

A first alternative movable indicator 76 having a three dimensional bulging effect is shown in FIGS. 20 and 21. This movable indicator 76 is formed by an array of squares, which have a distorted shape so that the movable indicator 76 appears to bulge outwards from the electronic display 72. To provide user feedback, the degree of distortion or bulging increases as the user's hand 46 is moved closer to the electronic display 72. This provides a further visually interesting feature which may make operation of the device 10 more enjoyable. When the movable indicator 76 is moved over an icon 62, the shape of the icon 62 may remain unchanged, so that the movable indicator 76 appears to sit above the icon 62. Alternatively, the icon 62 could itself become distorted, so that the icon 62 also appears to bulge out from the electronic display 72 when selected.

Figure 22:
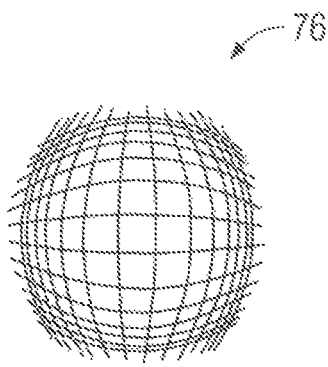
FIG. 22 shows a detailed view of a second alternative movable indicator having a three-dimensional bulging effect, which may be used in place of the movable indicator of FIG. 18.

In an alternative embodiment, the electronic display 72 could be configured to display a regular grid pattern formed by interesting horizontal and vertical lines. In such an embodiment, the movable indicator 76 could be displayed as a distortion of the grid, as shown in FIG. 22. The distortion could be configured to take any desired form, such as a sphere, cone, cube, or wave that appears to bulge out from and/or into the electronic display 72.

The device 10 could be configured to also act as a mirror, as in the previously described embodiments. For example, the device 10 could incorporate an optically reflective surface, or could use cameras 14 to capture images for display on the electronic display 72. Alternatively, the device 10 could simply control the dispensing of fluids, and may not act as a mirror at all. The device 10 could furthermore be used for any number of purposes other than the dispensing of fluids. For example, the device 10 could be adapted for use in other contexts such as for controlling a television or a general purpose computer. In such embodiments, components such as the spout body 16, soap dispenser 20, and hand cleaner dispenser 22 could, of course, be omitted.

Preferably, the device 10 is configured so that the movable indicator 76 merely tracks the movement of the user's hand 46, and does not rely on the detection of specific hand gestures. This allows for the use of relatively simply sensors 74, as well as significantly reduced processing power to interpret the detection signals from the sensors 74. The device 10 preferably is configured to detect and track any suitable object placed near the electronic display 72 including, for example, a cane or a prosthetic. The device 10 could, of course, be configured to detect specific hand gestures if desired.

In some embodiments, the electronic display 72 may display graphics that directly interact with the movable indicator 76 to control parameters such as water 36 temperature and volume. For example, the electronic display 72 could display a temperature slide graphic having a slidable marker indicating the water 36 temperature. To adjust the temperature, the movable indicator 76 can be moved along the slide graphic, dragging the slidable marker to the desired temperature. The electronic display 72 could also display a rotatable tap graphic that would appear to rotate when the movable indicator 76 is placed over the tap graphic and the user's hand 46 is turned. This would simulate the turning of a manually operated water tap, and could be used to control the volume of water 36 that is dispensed.

Figure 23:
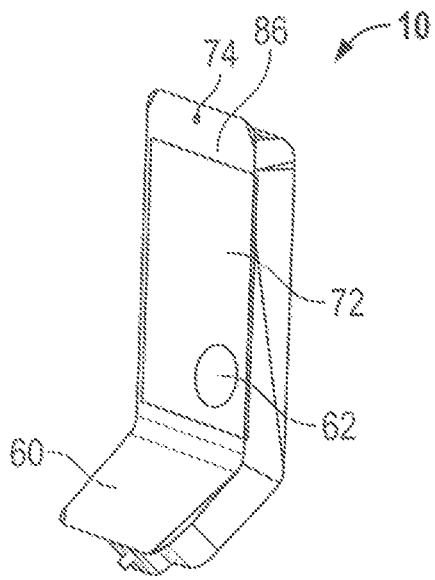
FIG. 23 shows a perspective view of a fluid dispensing device in accordance with a sixth preferred embodiment of the invention.
Figure 24:
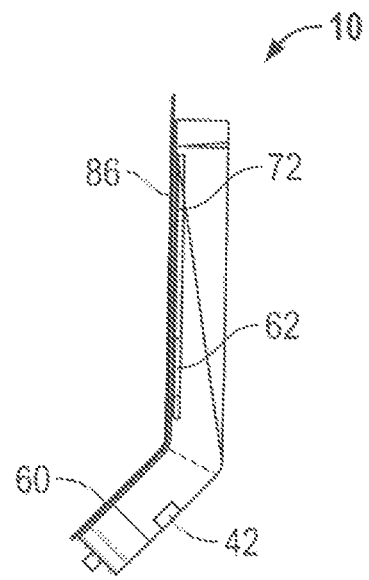
FIG. 24 shows a side view of the fluid dispensing device of FIG. 23.

A fluid dispensing device 10 in accordance with a sixth preferred embodiment of the invention is shown in FIGS. 23 and 24, wherein like numerals are used to represent like components. The device 10 is generally similar to that shown in FIGS. 8 to 11.

The device 10 incorporate a one-way mirror 86, with an electronic display 72 positioned behind the one-way mirror 86. The one-way mirror 86 is configured to reflect some light and allow some light to pass through. This permits the one-way mirror 86 to provide an optical reflection while also allowing graphics displayed on the electronic display 72 to be visible through the one-way mirror 86.

In particular, when the electronic display 72 is dark and the area around the device 10 is bright, there is little to no light that passes from the electronic display 72 through the one-way mirror 86. A user standing in front of the device 10 under such conditions will therefore primarily see his or her reflection in the one-way mirror 86. When a portion of the electronic display 72 is sufficiently lit up, such as to display an icon 62, the light from the icon 62 becomes visible to the user. By maintaining most of the electronic display 72 dark, while displaying bright icons 62 or other graphics in limited areas, the device 10 is able to provide both an optical reflection as well as display graphics such as selectable icons 62.

The device 10 may be operated in much the same way as the previously described embodiments. In particular, by placing the user's hand 46 near an icon 62, the icon 62 can be selected. By selecting icons 62, the dispensing of fluids such as water 36 and soap 24 can be controlled. The use of the one-way mirror 86 to provide an optical reflection permits the device 10 to act as a mirror, without requiring cameras 14 and the processing resources that would otherwise be required to electronically produce a mirror-like image on the electronic display 72.

Figure 25:
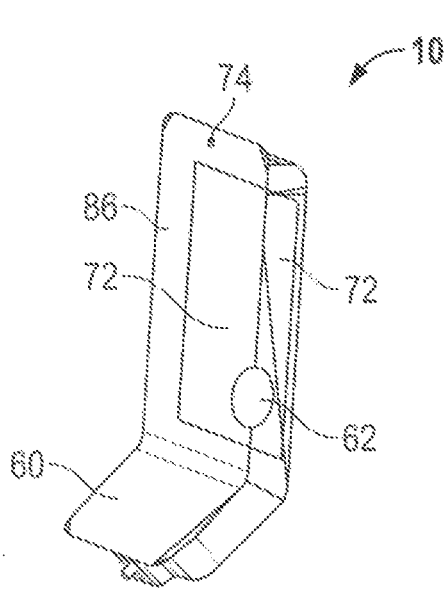
FIG. 25 shows a perspective view of a fluid dispensing device in accordance with a seventh preferred embodiment of the invention.
Figure 26:
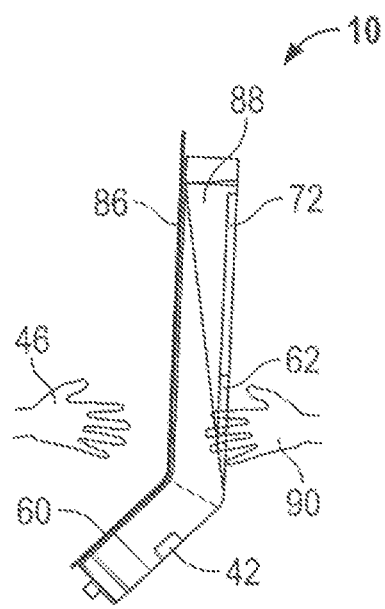
FIG. 26 shows a side view of the fluid dispensing device of FIG. 25.

A fluid dispensing device 10 in accordance with a seventh preferred embodiment of the invention is shown in FIGS. 25 and 26, wherein like numerals are used to represent like components. The device 10 is identical to that shown in FIGS. 23 and 24, with the exception that there is a gap 88 between the one-way mirror 86 and the electronic display 72. This gap 88 produces an effect wherein the graphic elements displayed on the electronic display 72, such as icons 62, appear to be spaced behind the one-way mirror 86. As such, users intuitively understand that they are unable to physically touch the icons 62, and are thus discouraged from touching the one-way mirror 86.

Furthermore, this configuration of the device 10 produces an effect wherein the user's hand 46, when positioned at a particular location in front of the one-way mirror 86, produces a reflection 90 that appears, to the user, to contact or intersect with the icon 62. This is shown in FIG. 26. The user is thus encouraged to place his or her hand 46 at this location, providing an intuitive means by which to select icons 62 and control the device 10. The icon 62 preferably gets brighter or otherwise changes in visual appearance when selected, to provide feedback to the user that his or her hand 46 has been placed at the correct location.

In some embodiments of the invention, the electronic display 72 may be configured to provide a visual indication that the user's reflection 90 is used for controlling the device 10. For example, when the user's reflection 90 intersects the plane of the electronic display 72, the display 72 may be configured to produce a visual effect, such as a glowing spot or light trail that follows the motion of the reflection 90. The effect may, for example, be similar to the movable indicator 76 described in the previous embodiments. The electronic display 72 could also display an animated ripple effect, so it appears that the reflection 90 is moving through water, for example.

The electronic display 72 may also display icons 62 or other graphics that can be manipulated by the user's reflection 90. For example, the electronic display 72 may display a rotatable dial graphic for controlling water 36 temperature. The dial graphic may be rotated to select the desired water 36 temperature by placing the reflected hand 90 over the dial graphic, so it appears to be grasping the dial, and then turning the user's hand 46 so that the reflection 90 appears to turn the dial. In some embodiments, the electronic display 72 may display graspable graphics that the user can move using reflection 90.

While the device 10 has been described above as for controlling the dispensing of fluids such as water 36 and soap 24, it is to be appreciated that the device 10 could be adapted for any number of other uses, such as controlling a general purpose computer or a television, or for any other purpose where touchless control may be used.

In some embodiments of the invention, the device 10 may be configured to display advertisements, artwork, or pictures when not in use. When a user approaches the device 10, the artwork may disappear and be replaced with a graphical user interface. In embodiments where a number of devices 10 are arranged side-by-side, such as in public washrooms, each device 10 could be configured to display a different part of the artwork, so that a single, large reproduction of the artwork is prominently displayed across the entire set of devices 10.

Reference is made to FIGS. 27 to 33 showing a fluid dispensing device 10 in accordance with a seventh embodiment of the invention. As with the other embodiments, similar reference numerals are used to refer to similar elements. The fluid dispensing device 10 includes a spout body 16 which is mounted to a wall 100 to extend horizontally from the wall. Below the spout body 16, a basin or sink 18 is provided. The wall 100 is shown as supporting an optional mirror 12 which may be merely a conventional mirror that reflects an image of the user in front of the mirror.

Figure 27:
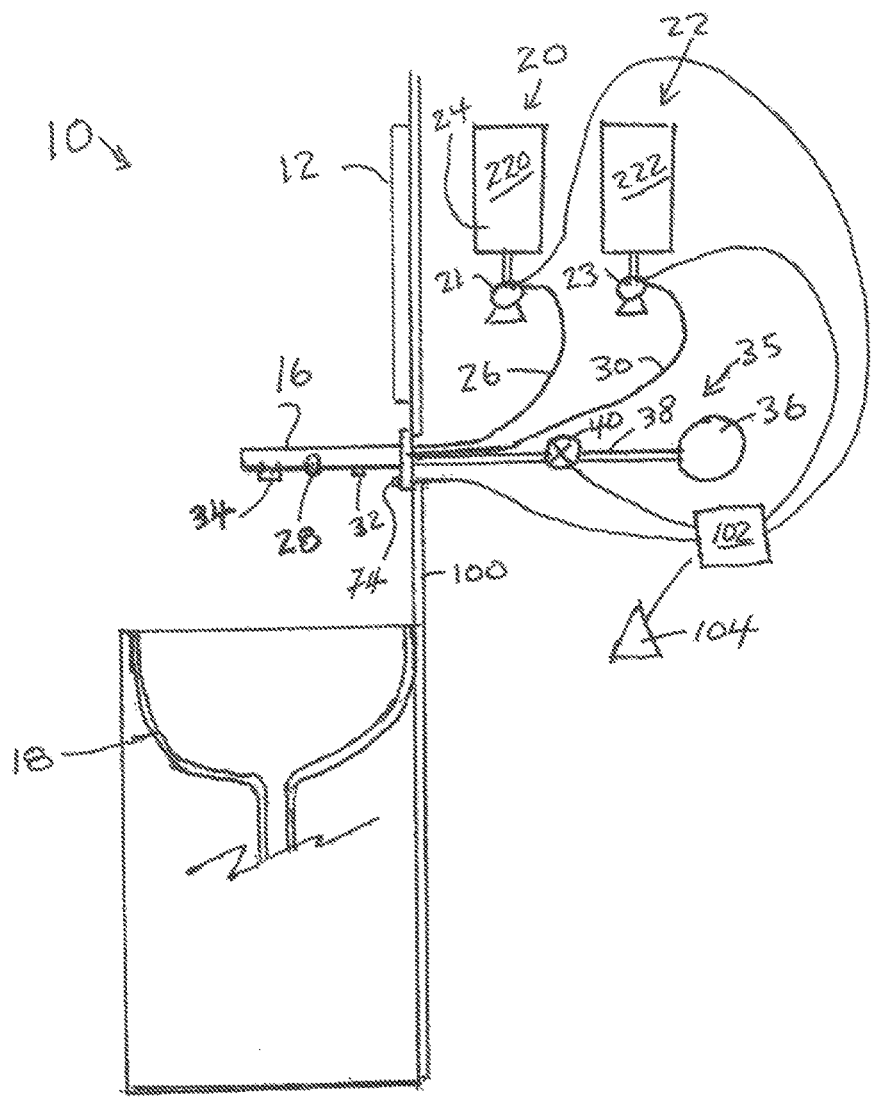
FIG. 27 is a schematic side view of a fluid dispensing device in accordance with a seventh preferred embodiment of the invention.

In FIG. 27, the fluid dispensing device 10 is schematically illustrated to include a soap dispenser 20, a disinfectant or hand sanitizer dispenser 22 and a water dispenser 35. The soap dispenser 20 has a reservoir 220 containing soap 24 and an electrically powered discharge mechanism as in the form of a pump 21 to pump an allotment of the soap 24 via a soap discharge line 26 through the spout body 16 to out a soap outlet 28 on the spout body 16.

The hand sanitizer dispenser 22 likewise has a reservoir 222 containing a hand sanitizer fluid and an electrically powered discharge mechanism in the form of a pump 23 operable to pump an allotment of the hand sanitizer via a hand sanitizer discharge line 30 through the spout body 16 to a hand sanitizer outlet 32 on the spout body 16. The water dispenser 35 includes a supply of pressurized water 36, a water pipe 38 and an electronically operated valve mechanism 40 that controls the flow of water through via water pipe 38 through the spout body 16 to a water outlet 34 on the spout body 16. Various sensors schematically indicated as 74 on FIG. 27 are provided to sense the location of a user's hands relative to the spout body 16 and its outlets 28, 32 and 34.

The discharge device 10 includes an electronic controller 102 and a power source 104. The controller 102 is schematically shown to be coupled to the sensors 74, to the soap dispenser 20, to the hand sanitizer dispenser 22 and to the water valve mechanism 40 so as to control the operation of the fluid dispensing device 10 to suitably discharge the water, the soap and the hand sanitizer. In operation of the fluid dispensing device 10 as shown in FIG. 27, a user's hands are to be placed underneath the spout body 16 at selected locations to selectively activate the dispensing of the water dispenser 35, the soap dispenser 20 or the hand sanitizer dispenser 22 depending upon the relative location of the user's hands as sensed by the sensor 74. Excess water, soap or sanitizer may pass downwardly past the user's hands to be received by the sink 18.

Figure 28:
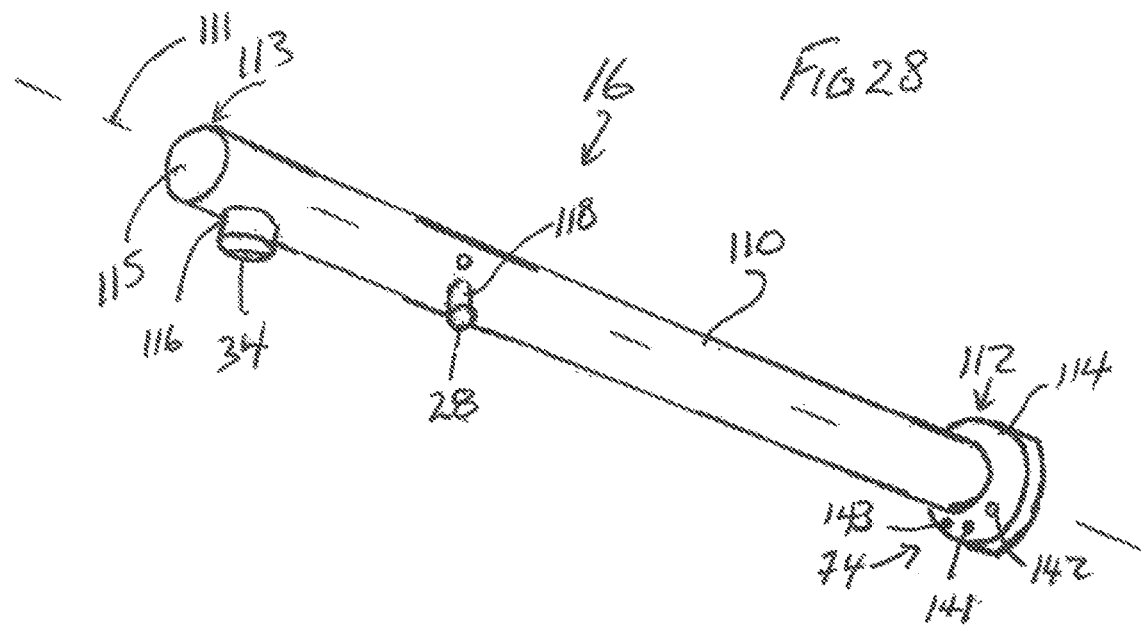
FIG. 28 is a pictorial view of a spout of the fluid dispensing device of FIG. 27 as seen from the right side and below.
Figure 29:
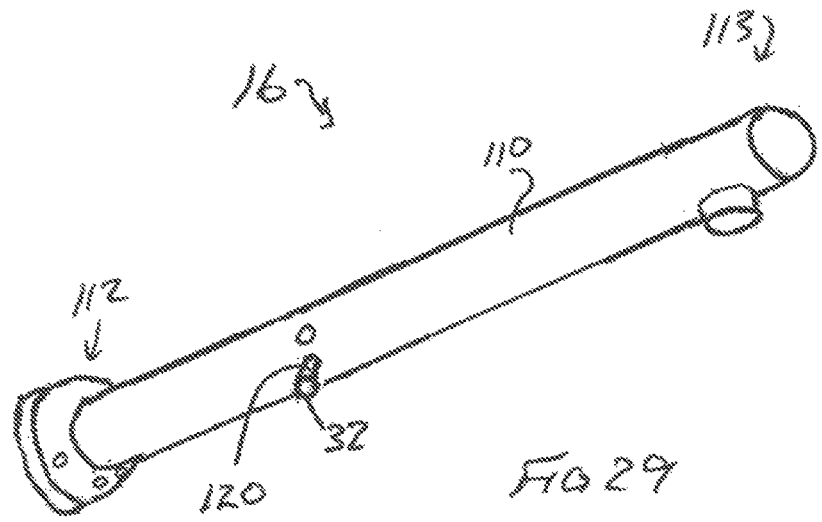
FIG. 29 is a perspective view of the spout of FIG. 28 as seen from the left side and below.
Figure 30:
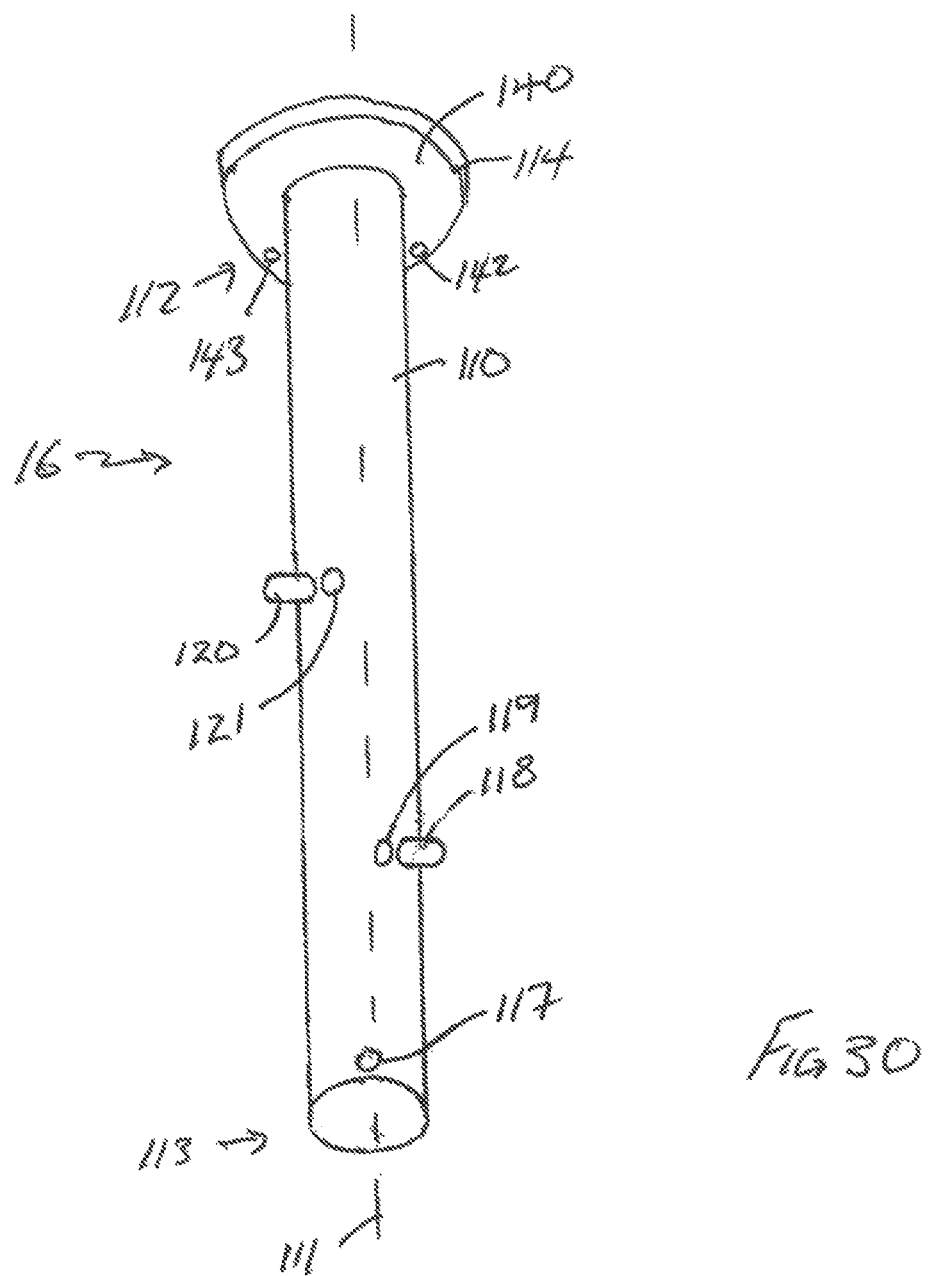
FIG. 30 is a perspective view of the spout of FIG. 28 as seen from the front and above.

Reference is made to FIGS. 28, 29 and 30 showing merely the spout body 16 of the fluid dispensing device 10 of FIG. 27. The spout body 16 includes an elongate spout tube 110 extending about a straight longitudinal axis 111 from a rear proximate end 112 where the spout tube 110 is secured to the wall 100 to a first distal end 113. At the proximate end 112, the spout body 16 includes an enlarged diameter support flange 114. The elongate spout tube 110 is shown as being cylindrical of a constant radius. At the distal end 113, an end face 115 is shown which is planar and perpendicular to the longitudinal axis 111.

A water discharge tube 116 extends downwardly from the spout tube 110 proximate the distal end 113 of the spout tube 110. The water tube 116 ends at the water outlet 34 providing the water outlet 34 to be directed downwardly.

A soap tube 118 extends radially from the spout tube 110 spaced longitudinally rearwardly from the water tube 116 and on the right side of the spout tube 110. Preferably, the soap tube 118 is directed radially towards the right from the longitudinal axis 111. The soap tube 118 ends at the soap outlet 28.

A sanitizer tube 120 is provided on the spout tube 110 spaced longitudinally rearwardly from the soap tube 118 and on the left side of the spout tube 110. Preferably, the sanitizer tube 120 is directed to extend towards the left radially from the longitudinal axis 111. The sanitizer tube 120 ends at the hand sanitizer outlet 32.

The spout tube 110 is provided with a water visual indicator 117 proximate the water tube 116 which is visible to a user in front of the spout body 16. Similarly, a soap visual indicator 119 is provided on the spout tube 110 proximate to the soap tube 118 visible to a user in front of the spout body 16 and a sanitizer visual indicator 121 is provided on the spout tube 110 proximate the sanitizer tube 120 and visible to a user in front of the spout body 16.

The water visual indicator 117 is preferably provided on an upper surface of the spout tube 110 above the water tube 118 proximate the distal end 113 of the spout tube 110. The soap visual indicator 119 is preferably provided on the right side of the spout tube 110 above the soap tube 118. The sanitizer visual indicator 121 is preferably provided on the left side of the spout tube 110 above the sanitizer tube 120.

The flange 114 includes a forwardly directed annular forward surface 140 which is shown to carry the sensors 74 better shown on FIG. 28 as comprising a water sensor 141, a soap sensor 142 and a sanitizer sensor 143. The water sensor 141 is located vertically below the longitudinal axis 111 centered on the spout tube 110 as seen from the front. The soap sensor 142 is provided to the right side of the spout tube 110 at an angular position to the right of the water sensor 141. The sanitizer sensor 143 is provided to the left of the spout tube 110 at an angular position to the left from the water sensor 141. Each of the water sensor 141, the soap sensor 142 and the sanitizer sensor 143 may comprise one or more sensors which have a capability to sense individually or cooperatively the presence and location of a user and the user's hands relative to the spout body 16. Each of the sensors preferably comprise a time of flight sensor.

Figure 31:
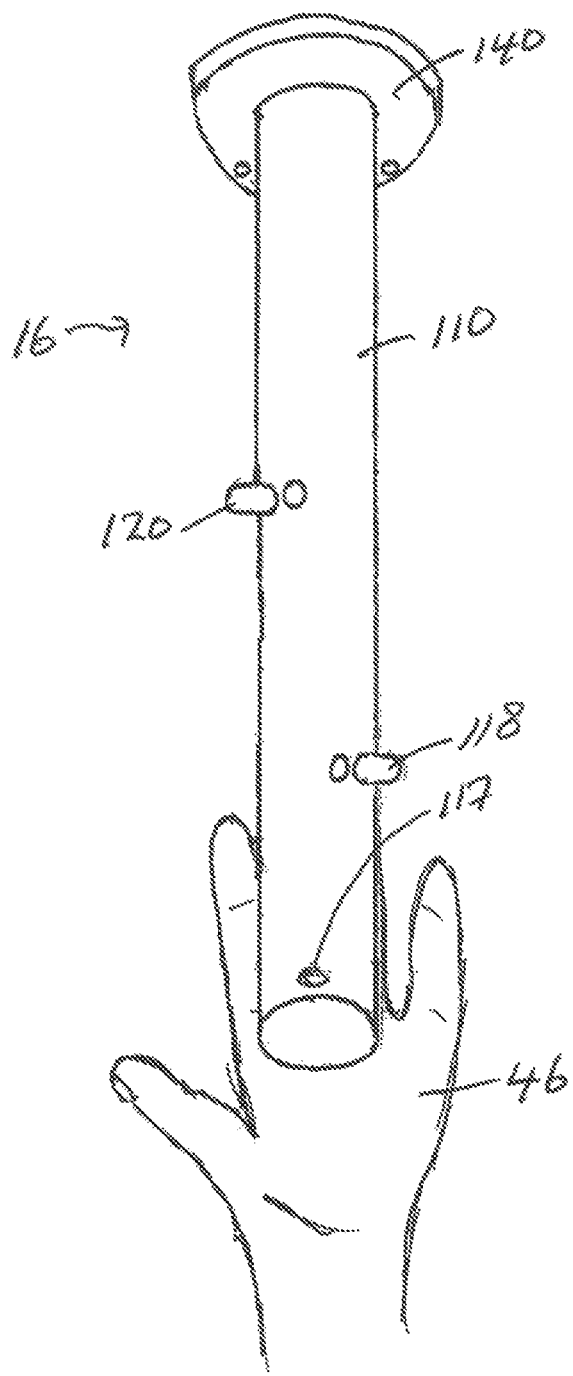
FIG. 31 is a perspective view the same as in FIG. 30 but showing a hand disposed below a water dispensing outlet on the spout.

Operation of the fluid dispensing device 10 is now described with reference to FIGS. 31, 32 and 33 showing the spout body 16 as in FIG. 30 as seen in pictorial view from the front end above, however, with a user's hand 46 positioned in different positions relative to the spout body 16 which selective positioning of the user's hand 46 as sensed by the time of flight sensors 141, 142 and 143 identify the hand 46 as being in preselected zones relative to the water, soap and sanitizer outlets that an appropriate one of the water, soap and sanitizer dispensers is activated by the controller 102 to dispense the respective fluid onto the user's hand 46.

FIG. 31 illustrates the user's hand 46 disposed underneath the water outlet 34 within a preselected zone relative to the water outlet 34. In FIG. 31, the location of the user's hand 46 within the predetermined zone relative the water outlet 34 is determined by the time of flight sensors 141, 142 and 143 but most notably by the time of flight water sensor 141 which preferably is specifically calibrated so as to accurately identify when the user's hand 46 is within the preselected zone underneath and in proximity to the water dispenser 34 that water dispensed from the outlet 34 will be received on the user's hand 46.

FIG. 32 illustrates the user's hand 46 within a preselected zone relative to the soap dispenser outlet 28 as determined by the sensors 141, 142 and 143 and, most notably, by the time of flight soap sensor 142 which is preferably particularly calibrated to accurately identify when the user's hand 46 is within the preselected zone underneath and in proximity to the soap outlet 28 that soap dispensed from the soap outlet be received on the user's hand.

FIG. 33 shows the user's hand 46 within a preselected zone relative to the sanitizer dispenser 34. The location of the user's hand 46 in the preselected zone relative to the sanitizer dispenser 32 is determined by the time of flight sensors 141, 142 and 143 and, most notably, by the sanitizer sensor 143 which is calibrated to accurately identify when the user's hand 46 is within the predetermined zone underneath and in proximity to the sanitizer outlet 32 such that the sanitizer dispensed from the sanitizer outlet 32 will be received on the user's hand.

As can be seen on FIG. 30, the water outlet 34 is located longitudinally of the spout tube 110 close to the front distal end 113 of the spout body 16 directed vertically downward located centered on the longitudinal axis 111 of the spout tube 110. The soap outlet 28 is disposed longitudinally rearwardly from the water outlet 34 and on the right side of the spout body 16. The sanitizer outlet 32 is located longitudinally rearwardly of the soap outlet 28 and on the left side of the spout body 16. As seen in a comparison of FIGS. 31, 32 and 33, the relative longitudinal location on the spout tube 110, that is, relative the longitudinal axis 111, as well as the relative lateral location on the spout tube 110, that is, on the center to the right or to the left of the spout tube 110 are used to distinguish the locations of the preselected zones in which the user's hand 46 must be located so as to activate dispensing of the respective fluids.

The present applicant has appreciated that merely the relative different locations of the respective water discharge outlet 34, the soap discharge outlet 28 and the sanitizer discharge outlet 32 provide adequate information for a user to intuitively understand that by locating a hand at a relative position at each outlet that the fluid dispensing device 10 will then appropriately dispense one of the three fluids, that is, water, soap or sanitizer. The relative positions include positions located laterally relative a vertical center plane 300 shown on FIG. 34, that is, laterally centered, or to the left or right of the spout body 16 and its vertical center plane 300. The relative positions include positions located longitudinally relative the longitudinal axis 111, that is, preferably at an appropriate longitudinal position forwardly and rearwardly relative the longitudinal axis 111. The visual indicators 117, 119 and 121 are preferred to assist a user understand the locations to place the user's hands, however, the separate visual indicators 117, 119 and 121 are not necessary.

As a first level of providing a visual indicator, each of the water tube 116, the soap tube 118 and the sanitizer tube 120 may be of a different color, shape or appearance. Preferably, the water tube 116, the soap tube 118 and the sanitizer tube 120 may be of different colors. For example, preferably, the water tube 116 is of a color blue, the soap tube 118 is of a color green and the sanitizer tube 120 is of a color red.

The visual indicia 117, 119 and 121 may merely comprise, for example, a colored dot or other marking of the same color as the water tube 116, the soap tube 118 or the sanitizer 120, respectively, so as to assist in drawing to a user the locations to centering and longitudinal of the respective dispenser outlets.

The visual indicia 117, 119 and 121 may include a label such as, for example, as a text label, the word WATER for the visual indicia 117, SOAP for the visual indicia 119 and SANITIZER for the sanitizer visual indicia 121. Of course, the text label could be in any language. Rather than be a text label, each visual indicia could be a visual image that might signify, respectively, water, soap and sanitizer, for example, a wave image for water, an image of large bubbles for soap and an image of small bubbles for the sanitizer. The text label or visual image preferably will have a color of its corresponding water tube 116, soap tube 118 or a sanitizer tube 120.

The visual indicators may be static in the sense of merely providing a different color for each of the water tube 116, soap tube 118 or sanitizer tube 120 or having the visual indicia 117, 119 and 121 as a colored spot, or text label or visual image. The visual indicators may, however, be active in the sense of providing changes during the operation of the soap dispenser. As active indicators, each of the water visual indicia 117, the soap visual indicia 119 and the sanitizer visual indicia 121 may include light emitting devices, most preferably, LEDs which discharge light in a manner to assist in identifying the location of the relative discharge outlet and in providing feedback as to when the user's hand 46 may be in a predetermined zone relative to each of the respective outlets to trigger dispensing from the relative outlet. In a preferred arrangement, for example, if the water tube 116 is a color blue, the water visual indicia 117 may be an LED which would discharge the light of a blue color when a user's hand is in the preselected zone below the water outlet 34 suitable for dispensing of water. Preferably, the LED may be provided within a housing or bezel having a blue color. A similar green LED light could be provided as the soap visual indicia 119 and a similar red LED light could be provided as the sanitizer visual indicia 121.

With an LED as the visual indicia, the LED light could be controlled to be on when the hand 46 is in an appropriate preselected zone. The light may be controlled to be maintained on merely when the hand is in the predetermined zone. The light may also be controlled to merely be on when the hand is in the predetermined zone and appropriate liquid is also being dispensed. For example, in association with the soap dispenser 20 and the sanitizer dispenser 22, preferably, when a hand 46 is first placed in the appropriate preselected zone, after a first single dose of the soap or sanitizer is dispensed, the dispensing is stopped. The light may be solid while the user's hand is in the preferred preselected zone initially until dispensing is stopped when the light would be turned off. Possibly, after dispensing is stopped, if for a selected period of time the user's hand is maintained within the preselected zone, then a second dose of soap would be dispensed with the light again being on while soap is dispensed.

The preferred operation of the fluid dispensing device 10 provides for operation to dispense one of the fluids when the user's hand is sensed to be in a preselected zone.

In addition to the preselected zone for each fluid outlet, a precursor zone may be defined through which a user's hand is to be moved to reach each preselected zone. While the user's hand is in the precursor zone for each outlet, then an active indicator such as an LED lamp for a respective outlet can be controlled as to be flashed while the hand is in the precursor zone and until the hand is moved into the preselected zone. Preferably, the frequency with which the LED lamp is flashed may increase as the hand is moved closer toward the preselected zone.

Each of the respective outlets may have one or more passive and active visual indicators. The visual indicators assist in helping a user to intuitively understand that the relative movement of the hand relative to the spout body 16 in relation to the discharge outlets will permit a user to provide for selective dispensing of the various fluids dispensed by the fluid dispenser.

FIG. 34 shows a front view of the spout body 16 of FIG. 28, however, modified so as to show additional information displayed on the end face 115 of the spout tube 110. On FIG. 34, the end face 115 provides a visual display 215 via which information may be visually displayed to a user. In FIG. 34, the end face 115 is marked with the static graphic items comprising as text images the words "water", "soap" and "sanitizer" with a respectively colored graphic 217, 219 and 221 adjacent each.

Preferably, the text images are of a color corresponding to the color of the respective water tube 116, soap tube 118 and sanitizer tube 120. Preferably, each colored graphic 217, 219 and 221 comprises an LED light which will be illuminated when a user's hand is in an appropriate preselected zone for the respective fluid to be dispensed and of the respective color. Of course, each of the text images 'water", "soap" and "sanitizer" could be formed as transparent portions of the display which are illuminated either constantly or merely when the respective fluid is being dispensed. The display 215 on the end face 115 provides another form of visual indicators which assist a user in intuitively understanding the operation of the device 10. The display 215 could comprise an electronic display with almost infinite messages and indicators being able to be displayed for operation and maintenance of the dispenser 10.

FIG. 34 also shows in front view the lateral side to side and angular separation of the water outlet 34, the soap outlet 28 and the sanitizer outlet 32.

Reference is made to FIGS. 35 to 37 which show as an eight embodiment of a fluid dispenser 10 in accordance with the present invention with a spout body 16 having similarities to the spout body 16 shown in FIG. 27. However, the spout body 16 in FIG. 35 is mounted on a horizontal surface as to a countertop 101 at the rear of a sink 16.

The spout body 16 of FIG. 35 includes an elongate spout tube 110 which extends along a longitudinal 111 which extends upwardly in a vertical straight first portion 201 through a bent second portion 202 and into a straight third portion 203 that angles forwardly and upwardly to a distal end 113. A plurality of sensors 74 are provided including a time of flight water sensor 141, soap sensor 142 and sanitizer sensor 143. In the embodiment of FIG. 35, the water tube 34 is located forwardly on the spout tube 110 extending vertically downwardly proximate the distal end 113. The soap outlet 28 extends radially towards the right side and the sanitizer outlet 32 extends towards the left side. In the embodiment of FIG. 35, the soap outlet 28 and the sanitizer outlet 32 are located the same longitudinal distance rearward from the water tube 116 and the relative left to right orientation of a user's hand 46 as sensed by the appropriate sensors 141, 142 and 143 is used to determine if soap or sanitizer is to be dispensed.

In the embodiment of FIG. 35, merely a soap visual indicia 119 and a sanitizer visual indicia 121 are provided. No water indicia is shown. The visual indicia 119 preferably comprises three LEDs 331, 332 and 333. The visual indicia 121 preferably comprises three LEDs 341, 342 and 343. Each of the LEDs are preferably provided in a gill-like recess 350 that extends radially inwardly into the spout tube 110 as defined by a forwardly directed rear surface 351 and a sidewardly directed side surface 352. Preferably, each LED light is provided to discharge light forwardly through the rear surface 351 when each LED lamp is activated. While not necessary, preferably each LED light is of a color which corresponds to a color provided about the respective soap tube outlet 28 and sanitizer outlet 32. This configuration of the visual indicia 119 and 121 is advantageous so that each is provided within the confines of the spout tube 110 yet direct light that can be seen by a user in front of the spout body 16. The three LEDs 331, 332 and 333 comprising the visual indicia 119 may be controlled by the controller so as to flash in a sequenced operation as in a manner to appear to encourage to draw a user's hand to move the hand towards the soap outlet 28. As well, the activation of the LEDs 331, 332 and 333 can be used as to vary time intervals between activations as to provide a visual indicator to a user that the user's hands are to be moved towards or are in the predetermined positions such that the soap is dispensed and/or to indicate that the soap is being dispensed. The three LEDs 341, 342 and 343 comprising the visual indicia 121 for the sanitizer outlet 32 may operate in an analogous manner.

In the embodiment of FIGS. 35 to 37, aside from the water tube 116, no other visual indicia is provided associated with the water discharge outlet 34 although various visual indicators for the water could be provided.

In FIGS. 35 to 37 as in the seventh embodiment of FIG. 27, three time of flight sensors 141, 142 and 143 are provided on an enlarged diameter support flange 114. Of course, sensors may be suitably located at any position on the spout tube 16 or environment surrounding the spout tube 16. As well, in both the eighth embodiment and the seventh embodiment, while time of flight sensors are preferred, many other forms of sensors may be used as may be useful to locate the relative positions of a user's hands relative to the spout including without limitation IR sensors and capacitive sensors.

The seventh and eighth embodiments illustrate fluid dispensing devices 10 to dispense three fluids, soap, sanitizer and water and disposed above a basin or sink 16. Of course, the fluid dispensing device 10 may be adapted to dispense two, three, four or more different fluids from corresponding outlets located at different respective locations on the spout. The fluids may be selected from water, a first-hand cleaning fluid, a second hand cleaning, a third hand cleaning fluid, a disinfectant or sanitizer, hand cream and drying air. Of course, almost any other flowable materials could be dispensed, and each could be a foam mixed with air.

The fluid dispensing device 10 in the seventh and eighth embodiments shows the spout body 16 above a sink. The provision of a sink is not necessary particularly when the fluids to be dispensed do not include water which is typically to be dispensed in excess.

In the seventh and eighth embodiments, the water dispenser 35 is simplistically illustrated as dispensing from but a single source of water. It is to be appreciated that the water source may comprise a source of cold water and a source of hot water with a suitably controlled mixing valve to discharge water at desired temperatures. If desired, user interfaces may be provided to select the temperature of the water.

In the seventh and eighth embodiments, the spout body 16 has preferably been shown as an elongate tubular member. This is not necessary. The dispensing spout may have various other shapes including the shape of the spout and the other embodiments and the shape of the many diverse typical spouts provided above sinks which are known. In accordance with the arrangements of the seventh and eighth embodiments, the relative location of outlets for different fluids at different locations on the spout permit a user to intuitively appreciate the operation of the dispensing device 10 by simple trial and error experimentation leading quickly to the user's understanding as to a proper manner of operating the fluid dispensing device to obtain selected fluids as desired by the user.

In the seventh embodiment a mirror 12 has been shown as part of the fluid dispensing device 10. The mirror may incorporate features of the electronic mirror with or without a one way mirror and provide for use of features of the electronic display in accordance with the other embodiments but in conjunction with a spout body 16 of the seventh embodiment.

Each of the first to eight embodiments teach the dispensing of various materials which notably include hand cleaning fluids such as soap. The materials to be dispensed include foamed materials which are discharged as a foam of a liquid admixed with air by the simultaneous passing of the liquid and air through a foam generator before discharge.

Although this disclosure has described and illustrated certain preferred embodiments of the invention, it is to be understood that the invention is not restricted to these particular embodiments. Rather, the invention includes all embodiments which are functional, mechanical, electrical, or optical equivalents of the specific embodiments and features that have been described and illustrated herein.

We claim:

1. A material dispensing device dispensing selected materials onto a user's hand wherein the selected materials include a first material and a second material, the device comprising:
an electronic display configured to display to a user in front of the electronic display computer generated graphics;
at least one sensor configured to touchlessly detect an object placed in proximity to the electronic display;
a computer system configured to determine a position of the object relative to the electronic display based on detection data received from the at least one sensor,
characterized by:
a spout body
having a fluid outlet,
the fluid outlet including a first material dispenser outlet,
a first material dispenser operable when activated to discharge the first material from the first material dispenser outlet; and
the electronic display is configured to display as the computer generated graphics a first graphic element representing the first material;
the computer system is configured to activate the first material dispenser when the position of the object is determined to be within a preselected zone in proximity to the first graphic element,
the fluid outlet including a second material dispenser outlet,
a second material dispenser operable when activated to discharge the second material from the second material dispenser outlet; and
wherein the electronic display is configured to display as the computer generated graphics a second graphic element representing the second material;
wherein the computer system is configured to activate the second material dispenser when the position of the object is determined to be within a preselected zone in proximity to the second graphic element,
a light guide running between the electronic display and the fluid outlet on the spout body;
the electronic display and the light guide are configured to provide a first path of light between the first graphic element and the fluid outlet, and
the electronic display and the light guide are configured to provide a second path of light between the second graphic element and the fluid outlet,
wherein the first path of light between the first graphic and the fluid outlet is illuminated as a function of when the position of the object is determined to be within the preselected zone in proximity to the first graphic element, and
wherein the second path of light between the second graphic and the fluid outlet is illuminated as a function of when the position of the object is determined to be within the preselected zone in proximity to the second graphic element.

2. The material dispensing device of claim 1 wherein:
the selected materials include a third material,
the fluid outlet includes a third material dispenser outlet,
a third material dispenser operable when activated to discharge the third material from the third material dispenser outlet;
wherein the electronic display is configured to display as the computer generated graphics a third graphic element representing the third material; and
the computer system is configured to activate the third material dispenser when the position of the object is determined to be within a preselected zone in proximity to the third graphic element;
the electronic display and the light guide are configured to provide a third path of light between the third graphic element and the fluid outlet, and
wherein the third path of light between the third graphic and the fluid outlet is illuminated as a function of when the position of the object is determined to be within the preselected zone in proximity to the third graphic element.

3. The material dispensing device of claim 1 wherein the at least one first material is a material capable of flowing selected from the group of water, a first-hand cleaner, a second hand cleaner, a hand lotion and drying air, and the second material is a material capable of flowing selected from the group of water and the first hand cleaner.

4. The material dispensing device as claimed in claim 3 wherein:
the first material comprises a first-hand cleaning fluid,
the first material dispenser comprising a first-hand cleaning fluid reservoir containing the hand cleaning fluid and a first-hand cleaning fluid pump operable to discharge the first hand cleaning fluid from the first hand cleaning fluid reservoir out the first material dispenser outlet for the first hand cleaning fluid.

5. The material dispensing device as claimed in claim 1, wherein:
the first material comprises a first-hand cleaning fluid,
the first material dispenser comprising a first-hand cleaning fluid reservoir containing the hand cleaning fluid and a first-hand cleaning fluid pump operable to discharge the first hand cleaning fluid from the first hand cleaning fluid reservoir out the first material dispenser outlet for the first hand cleaning fluid, and
the second material comprises water,
the second material dispenser a water supply supplying the water and a water valve controlling the discharge of the water from the second material dispenser outlet.

6. The material dispensing device of claim 1 wherein:
the object is a first hand of the user,
the first material outlet located relative to the electronic display such that when the position of the first hand is determined to be within the preselected zone in proximity to the first graphic element, a second hand of the user is capable of being placed at the first material discharge outlet to receive the first material discharged by the first material dispenser, and
the second material outlet located relative to the electronic display such that when the position of the first hand is determined to be within the preselected zone in proximity to the second graphic element, the second hand of the user is capable of being placed at the second material dispenser outlet to receive the second material discharged by the second material dispenser.

7. The material dispensing device as claimed in claim 6 including:
an upwardly open basin,
the basin disposed below the electronic display,
the first material dispenser outlet located for discharge of the first material into the basin with space between the first material dispenser outlet and the basin for one of the user's hands to be placed under the first material dispenser outlet to receive the first material dispensed, and
the second material dispenser outlet located for discharge of the second material into the basin with space between the second material dispenser outlet and the basin for one of the user's hands to be placed under the second material dispenser outlet to receive the second material dispensed.

8. The material dispensing device of claim 6 wherein:
the computer system is configured to identify the first graphic element representing the first material as a selected graphic based on the position of the object relative to the first graphic element representing the first material; and
the computer system is configured to activate the first material dispenser when the first graphic element representing the first material dispenser is the selected graphic and the location of the object is determined to be within the preselected zone in proximity to the first graphic element, and
the computer system is configured to identify the second graphic element representing the second material as a selected graphic based on the position of the object relative to the second graphic element representing the second material; and
the computer system is configured to activate the second material dispenser when the second graphic element representing the second material is the selected graphic and the location of the object is determined to be within the preselected zone in proximity to the second graphic element.

9. The material dispensing device of claim 1 including an imaging device that displays to the user in front of the electronic display an image of the user.

10. The material dispensing device of claim 9 wherein the imaging device is selected from the group consisting of:
(a) the electronic display which displays to the user in front of the electronic display the image of the user as an electronic image of the user, and
(b) a one-way mirror that displays to the user in front of the electronic display the image of the user as a reflected image of the user with the electronic display arranged behind the one-way mirror, and configured to display the computer generated graphics visible through the one-way mirror.

11. The material dispensing device of claim 6 including a proximity sensor to detect the presence of one of the user's hands below the fluid outlet,
the computer system is configured to activate the first material dispenser and the second material dispenser as a function as to whether the proximity sensor detects the presence of one of the user's hands below the fluid outlet.

12. The material dispensing device according to claim 1 wherein the first path of light has a first color, and the second path of light has a second color that is different from the first color.

13. The material dispensing device according to claim 1 wherein the first path of light is illuminated gradually beginning near the first graphic element and then extending towards the first material outlet and/or the second path of light is illuminated gradually beginning near the second graphic element and then extending towards the second material outlet.

14. The material dispensing device according to claim 1 characterized in that the light guide comprises a first light guide and a second light guide;
    wherein the electronic display and the first light guide are configured to provide the first path of light between the first graphic element and the first material outlet when the first graphic element is the selected graphic; and
    wherein the electronic display and the second light guide are configured to provide the second path of light between the second graphic element and the second material outlet when the second graphic element is the selected graphic.

15. The material dispensing device of claim 7 including a proximity sensor to detect the presence of one of the user's hands below the fluid outlet,
    the computer system is configured to activate the first material dispenser and the second material dispenser as a function as to whether the proximity sensor detects the presence of one of the user's hands below the fluid outlet.

16. The material dispensing device as claimed in claim 15 including:
    an upwardly open basin,
    the basin disposed below the electronic display,
    the first material dispenser outlet located for discharge of the first material into the basin with space between the first material dispenser outlet and the basin for the user's hands to be placed under the first material dispenser outlet to receive the first material dispensed,
    the second material dispenser outlet located for discharge of the second material into the basin with space between the second material dispenser outlet and the basin for the user's hands to be placed under the second material dispenser outlet to receive the second material dispensed.

17. The material dispensing device of claim 16 including an imaging device that displays to the user in front of the electronic display an image of the user;
    wherein the imaging device is selected from the group consisting of:
    (a) the electronic display which displays to the user in front of the electronic display the image of the user as an electronic image of the user, and
    (b) a one-way mirror that displays to the user in front of the electronic display the image of the user as a reflected image of the user with the electronic display arranged behind the one-way mirror, and configured to display the computer generated graphics visible through the one-way mirror.

18. The material dispensing device of claim 1 including a proximity sensor to detect the presence of one of the user's hands below the fluid outlet,
    the computer system is configured to activate the first material dispenser and the second material dispenser as a function as to whether the proximity sensor detects the presence of one of the user's hands below the fluid outlet.

19. The material dispensing device of claim 1 wherein the spout body projects outwardly from the electronic display.

20. The material dispensing device of claim 15 wherein:
    the computer system is configured to identify the first graphic element representing the first material as a selected graphic based on the position of the object relative to the first graphic element representing the first material; and
    the computer system is configured to activate the first material dispenser when the first graphic element representing the first material is the selected graphic and the location of the object is determined to be within the preselected zone in proximity to the first graphic element, and
    the computer system is configured to identify the second graphic element representing the second material as a selected graphic based on the position of the object relative to the second graphic element representing the second material; and
    the computer system is configured to activate the second material dispenser when the second graphic element representing the second material is the selected graphic and the location of the object is determined to be within the preselected zone in proximity to the second graphic element.

* * * * *